United States Patent
Thresh et al.

(10) Patent No.: US 10,086,558 B2
(45) Date of Patent: *Oct. 2, 2018

(54) 3-D ELECTROSTATIC PRINTER USING TRACK BOUND PLATENS AND REGISTRATION SYSTEM

(71) Applicant: Xerox Corporation, Norwalk, CT (US)

(72) Inventors: Donald Thresh, Fairport, NY (US); Michael N. Soures, Webster, NY (US); Jonathan Ireland, Lancaster, PA (US); James D. Van Bortel, Rochester, NY (US); Bruce H. Smith, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/196,177

(22) Filed: Jun. 29, 2016

(65) Prior Publication Data

US 2018/0001554 A1 Jan. 4, 2018

(51) Int. Cl.
*B29C 67/00* (2017.01)
*B29C 64/20* (2017.01)
(Continued)

(52) U.S. Cl.
CPC ............ *B29C 64/20* (2017.08); *B29C 64/227* (2017.08); *B29C 64/386* (2017.08); *B29C 64/40* (2017.08);
(Continued)

(58) Field of Classification Search
CPC ......... B29C 64/00; B29C 64/10; B29C 64/20; B29C 64/112; B29C 64/227; B29C 64/386; B29C 64/236; B29C 64/245
See application file for complete search history.

(56) References Cited

U.S. PATENT DOCUMENTS

| 7,250,238 B2 | 7/2007 | Fromm et al. |
| 7,270,408 B2 | 9/2007 | Odell et al. |

(Continued)

OTHER PUBLICATIONS http://www.atlantadrives.com/systems1.htm. Accessed on Jun. 10, 2016. pp. 1-3.

(Continued)

*Primary Examiner* — Jason L Lazorcik
(74) *Attorney, Agent, or Firm* — Gibb & Riley, LLC

(57) ABSTRACT

3-D printing system include development stations positioned to electrostatically transfer build and support materials to an intermediate transfer surface, a transfer station adjacent the intermediate transfer surface, guides adjacent the transfer station, and platens moving on the guides. The guides are shaped to direct the platens to repeatedly pass the transfer station and come in contact with the intermediate transfer surface at the transfer station. The intermediate transfer surface transfers a layer of the build and support materials to the platens each time the platens contact the intermediate transfer surface at the transfer station to successively form layers of the build and support materials on the platens. The platens and the intermediate transfer surface include alignment features. The alignment features temporarily join at the transfer station, as the platens pass the transfer station, to align the platens with the intermediate transfer surface as the platens contact the intermediate transfer surface.

20 Claims, 26 Drawing Sheets

(51) Int. Cl.
    *B33Y 30/00*     (2015.01)
    *B33Y 40/00*     (2015.01)
    *B33Y 50/02*     (2015.01)
    *B29C 64/227*     (2017.01)
    *B29C 64/386*     (2017.01)
    *B29C 64/40*     (2017.01)

(52) U.S. Cl.
    CPC ............... *B33Y 30/00* (2014.12); *B33Y 40/00* (2014.12); *B33Y 50/02* (2014.12)

(56) References Cited

U.S. PATENT DOCUMENTS

| | | | |
|---|---|---|---|
| 7,851,549 B2 | 12/2010 | Sacripante et al. | |
| 8,470,231 B1 | 6/2013 | Dikovsky et al. | |
| 8,488,994 B2* | 7/2013 | Hanson | G03G 13/00 399/130 |
| 8,888,480 B2* | 11/2014 | Yoo | B29C 67/0081 264/113 |
| 9,193,110 B2 | 11/2015 | Pridoehl et al. | |
| 9,770,869 B2* | 9/2017 | Comb | B29C 64/386 |
| 9,789,701 B1 | 10/2017 | Ireland et al. | |
| 9,904,223 B2* | 2/2018 | Chillscyzn | B33Y 30/00 |
| 2012/0201960 A1* | 8/2012 | Hartmann | B33Y 30/00 427/256 |
| 2013/0078013 A1* | 3/2013 | Chillscyzn | G03G 15/169 399/307 |
| 2013/0186558 A1* | 7/2013 | Comb | B29C 67/0051 156/277 |
| 2014/0134334 A1 | 5/2014 | Pridoehl et al. | |
| 2015/0142159 A1 | 5/2015 | Chang | |
| 2015/0145174 A1* | 5/2015 | Comb | B29C 67/0092 264/464 |
| 2015/0273767 A1* | 10/2015 | Batchelder | G03G 15/224 264/401 |
| 2016/0009028 A1* | 1/2016 | Tjellesen | B41J 2/32 425/375 |
| 2016/0339646 A1* | 11/2016 | Baecker | B29C 64/141 |
| 2017/0008237 A1* | 1/2017 | Fess | B29C 67/0092 |
| 2017/0182714 A1* | 6/2017 | Sato | B33Y 10/00 |
| 2017/0210070 A1* | 7/2017 | Sreekumar | B33Y 10/00 |
| 2018/0001554 A1* | 1/2018 | Thresh | B29C 64/227 |

OTHER PUBLICATIONS http://www.nexeneurope.com/images/models/21238.pdf. Accessed on Jun. 10, 2016. pp. 1-12.
http://www.nexeneurope.com/images/models/21196classic.pdf. Accessed on Jun. 10, 2016. pp. 1-8.

\* cited by examiner

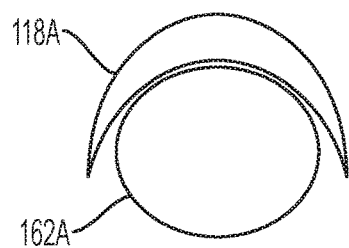
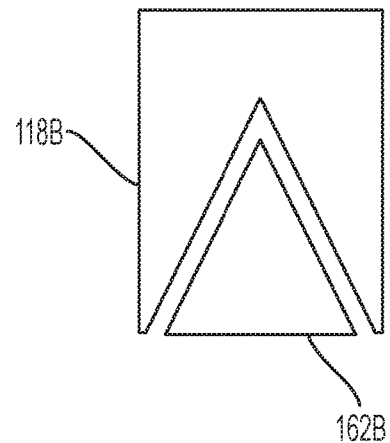
FIG. 20A  FIG. 20B
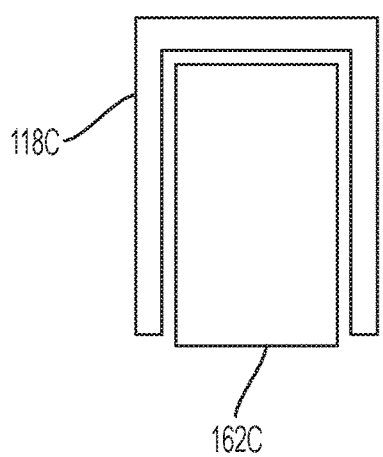
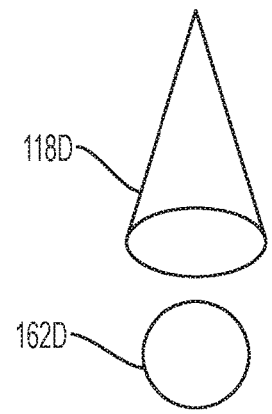
FIG. 20C  FIG. 20D

3-D ELECTROSTATIC PRINTER USING TRACK BOUND PLATENS AND REGISTRATION SYSTEM

BACKGROUND

Systems and methods herein generally relate to three-dimensional (3-D) printing processes that use electrostatic printing processes.

Three-dimensional printing can produce objects using, for example, ink-jet printers. In one exemplary three-stage process, a pulverulent material is printed in thin layers, a UV-curable liquid is printed on the pulverulent material, and finally each layer is hardened using a UV light source. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency and digital nature of printing systems.

SUMMARY

Exemplary three-dimensional (3-D) printing systems herein include, among other features, an intermediate transfer surface, such as an intermediate transfer belt (ITB). Development stations are positioned to electrostatically transfer build and support materials to the ITB. Also, a transfer station is adjacent the ITB, and guides are adjacent the transfer station. The guides define a path, and wheeled platens move on the guides. Any form of drive device moves the wheeled platens along the guides (e.g., an electric motor, a chain drive, magnetic drive units, etc.). For example, the guides can be rails, tracks, slots, magnetic pathways, and/or tubes, etc. The guides restrict movement of the wheeled platens, so that the wheeled platens can only move within the path.

More specifically, the guides are shaped to direct the wheeled platens to pass the transfer station and come in contact with the ITB at the transfer station. The ITB transfers a layer of the build and support materials to the wheeled platens each time the wheeled platens contact the ITB at the transfer station, to successively form layers of the build and support materials on the wheeled platens. The guides are positioned in a loop and return the wheeled platens to the transfer station after the wheeled platens pass through the transfer station to have more of the layers of the build and support materials transferred to the wheeled platens. The wheeled platens include a height adjustment that moves the top surface of the platen away from the ITB as a stack of the layers on the wheeled platens becomes larger.

The wheeled platens also include first alignment projections, and the ITB includes matching second alignment projections. The first alignment projections temporarily join with the second alignment projections at the transfer station, as the wheeled platens pass the transfer station, to align the wheeled platens with the ITB as the wheeled platens contact the ITB. Thus, the first alignment projections are shaped and sized to lock with the second alignment projections as the wheeled platens approach the transfer station, and to unlock from the second alignment projections as the wheeled platens depart from the transfer station. In some examples, the first alignment projections and the second alignment projections are matching pairs of balls and sockets, cones and cone receptacles, or cylinders and tubes.

These and other features are described in, or are apparent from, the following detailed description.

BRIEF DESCRIPTION OF THE DRAWINGS

Various exemplary systems and methods are described in detail below, with reference to the attached drawing figures, in which:

FIGS. 20A-20H are schematic cross-sectional diagrams illustrating alignment devices herein;

DETAILED DESCRIPTION

As mentioned above, electrostatic printing process are well-known means of generating two-dimensional (2-D) digital images, and the methods and devices herein use such processing for the production of 3-D items (for 3-D printing). However, when performing 3-D printing using electrostatic processes (especially those that use an intermediate transfer belt (ITB)), the mechanical integrity of the printed material may be compromised if it is very thin, and the transfer process can impose stripping shear forces that damage or smear the material.

Figure 1:
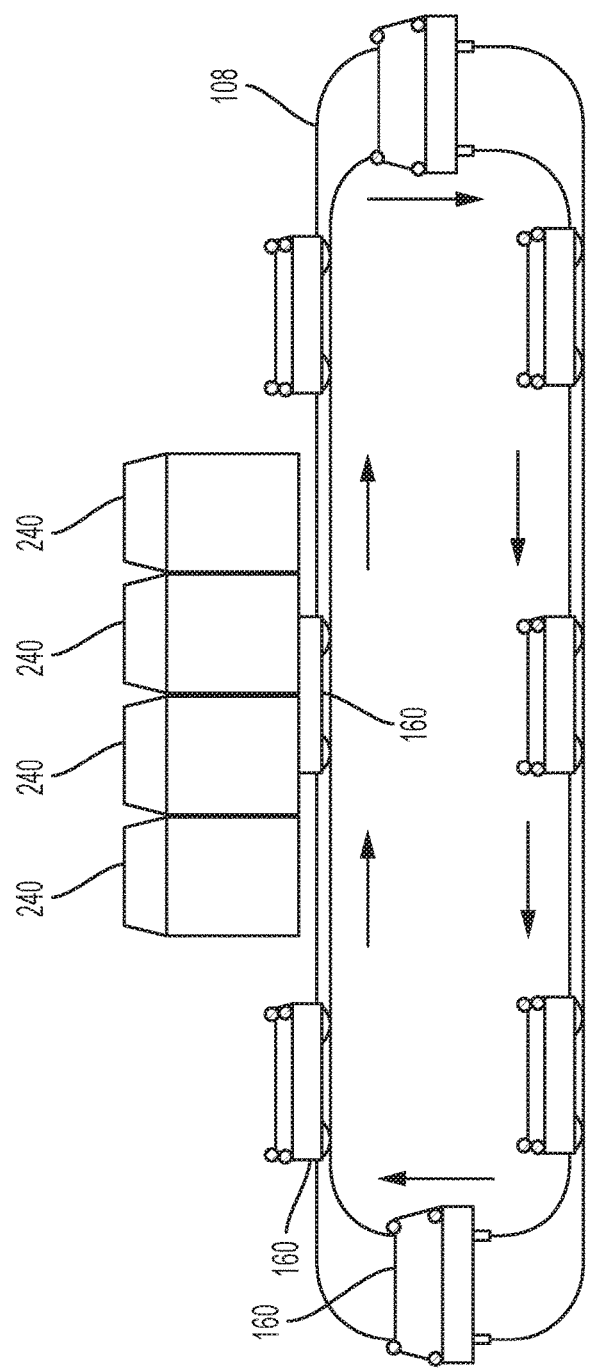
FIG. 1 is a perspective view diagram of a printing system herein.

In order to address such issues, as shown for example in FIG. 1, exemplary three-dimensional (3-D) printing systems herein include, among other features, one or more 3-D printers 240, and guides 108 that are shaped to direct wheeled platens 160 to repeatedly pass by (pass through), and return to, the 3-D printers 240. For example, the guides 108 can be rails, tracks, slots, magnetic pathways, and/or tubes, etc. The guides 108 restrict movement of the wheeled platens 160, so that the wheeled platens 160 can only move within the path defined by the guides 108. Any form of drive device 166 moves the wheeled platens 160 along the guides 108 (e.g., an electric motor, a chain drive, magnetic drive units, etc.).

Figure 2:
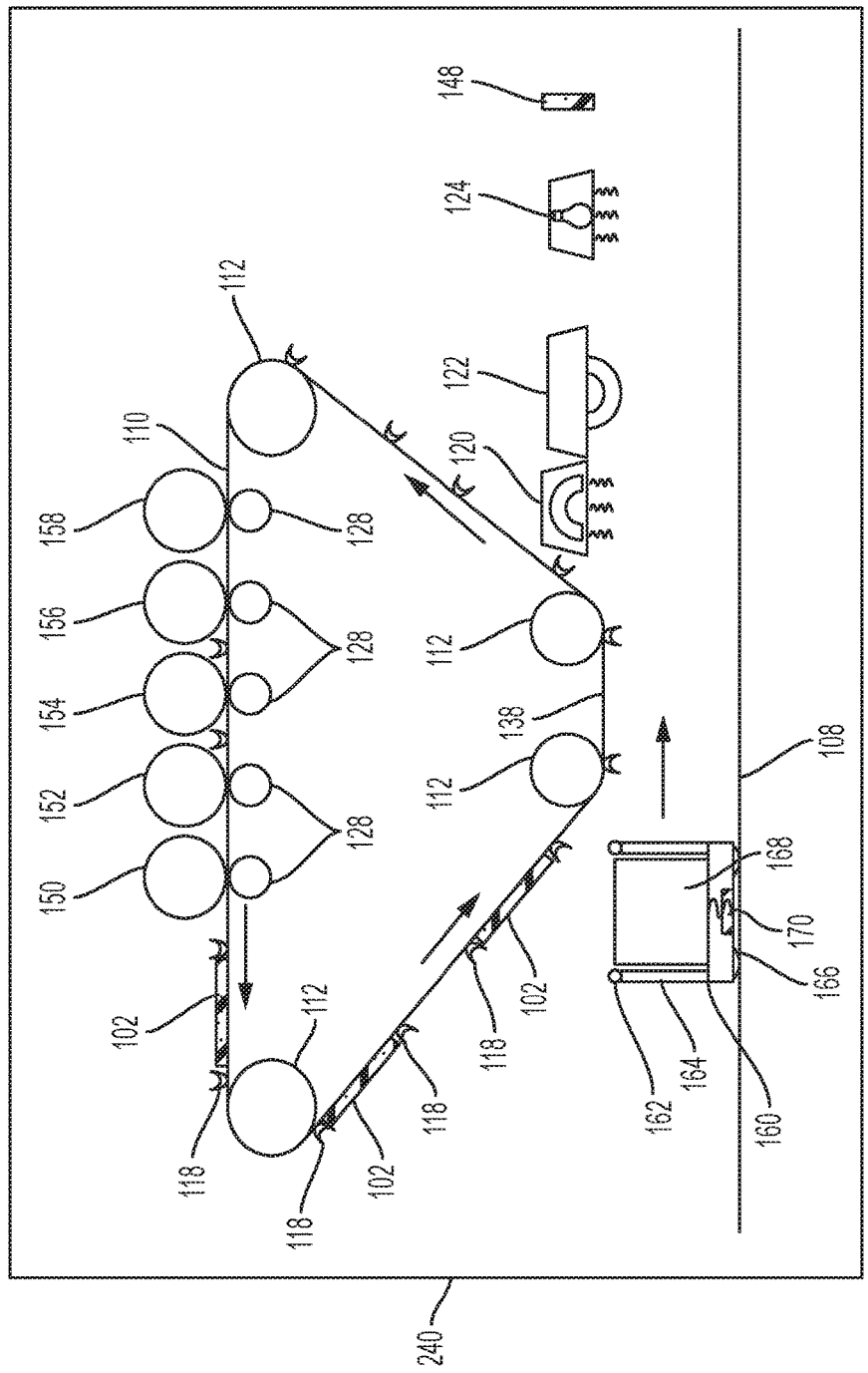
FIGS. 2-6 are schematic cross-sectional diagrams partially illustrating devices herein.

As shown in FIG. 2, each 3-D printer 240 includes an intermediate transfer surface, such as an intermediate transfer belt (ITB 110), and development stations 150-158 positioned to electrostatically transfer build and support materials 102 to the ITB 110. Also, a transfer station 138 is adjacent the ITB 110, and the guides 108 are adjacent the transfer station 138. More specifically, the guides 108 are shaped to direct the wheeled platens 160 to pass the transfer station 138 and come in contact with the ITB 110 at the transfer station 138.

As shown in greater detail below, the ITB 110 transfers a layer of the build and support materials 102 to a wheeled platen 160 each time the wheeled platen 160 contacts the ITB 110 at the transfer station 138, and this successively forms layers of the build and support materials 102 on the wheeled platens 160. FIG. 1 shows that the guides 108 are positioned in a loop and repeatedly return the wheeled platens 160 to the transfer station 138, after the wheeled platens 160 pass through the transfer station 138, to have more of the layers of the build and support materials 102 transferred to the wheeled platens 160. The wheeled platens 160 include a height adjustable platform 168, and the top of the adjustable platform (the surface closest to the ITB 110) moves away from the ITB 110 as the stack of layers on the wheeled platens 160 grows (becomes larger) from more and more layers 102 are transferred to the wheeled platen 160.

The height of the height adjustable platform 168 can be adjusted using any form of actuator structure 170 including electrical, magnetic, hydraulic, pneumatic, etc., actuators; and in one example the actuator structure 170 can include a stepper motor. In addition, the actuator structure 170 can include biasing mechanisms, such as springs and/or biasing bars, etc. Therefore, as additional layers 102 are transferred to the top of the height adjustable platform 168, the actuator structure 170 lowers the height adjustable platform 168 to compensate for the thickness of the layer 102 transferred to the top of the height adjustable platform 168. In addition, the biasing mechanisms of the actuator structure 170 allow the height adjustable platform 168 additional movement tolerances within each step of the stepper motor, to compensate for any unexpected layer thickness variations, any variations in the position of the ITB 110, any variations in the position of the guides 108, etc.

The wheeled platens 160 also include first alignment features (projections) 162, and the ITB 110 includes matching second alignment features (projections) 118 that are attached to the ITB 110. The first alignment projections 162 are positioned on supports 164 to extend the first alignment projections 162 to at least the height of the height adjustable platform 168 when the height adjustable platform 168 is fully extended toward the ITB 110. Thus, the supports 164 allow the first alignment projections 162 to always lock with the second alignment projections 118, even if height adjustable platform 168 is fully extended.

FIG. 2 also illustrates different color development stations 152-158 positioned to electrostatically transfer different colored curable (e.g., ultraviolet (UV) light curable) build materials to an intermediate transfer belt (ITB 110); and at least one support material development station 150 positioned to electrostatically transfer support material (e.g., which can also be UV light curable) to a location of the ITB 110 where the UV curable build materials are located on the ITB 110. For example, each different development station 152-158 can provide a color of build material that is different from the colors of the build materials supplied by other development stations 152-158. The color of the support material provided by support material development station 150 is not highly relevant because the support material dissolves in different solvents (relative to solvents that dissolve the UV curable build materials) and is eventually removed from the final structure, as discussed below.

In addition, these printers include a transfer or transfuse station 138 having at least one roller 112 on one side of the ITB 110 supporting the ITB 110 that aids transfer of the build and support materials to the wheeled platen 160. Thus, the ITB 110 electrostatically or mechanically transfers a layer 102 made up of the different color UV curable build materials and the support material to the wheeled platen 160 each time the wheeled platen 160 contacts the other side of the ITB 110 at the transfuse station 138 (the side of the ITB 110 opposite the transfuse station roller(s) 112); and this successively forms multiple layers 102 of the UV curable build materials and the support material on the wheeled platen 160. Each of the layers 102 is formed by the development stations 150-158 on a discrete area of the ITB 110 and is formed in a pattern before transfer to the wheeled platen 160.

The ITB 110 can be a flat, continuous belt supported on rotating rollers 112. Also, such structures include a heater 120, a pressure roller 122, and a curing station 124 that is positioned to apply light (e.g. UV light) using a light source. The structure can also include an optional support material removal station 148.

The color build material development devices 152-158 are aided by charge generators 128 in electrostatically transferring (by way of charge difference between the belt and the material being transferred) build material, such as a (potentially dry) powder polymer-wax material (e.g., charged 3-D toner) to the ITB 110, as is the support material development device 150 in electrostatically transferring a different material (e.g., the support material, again such as a powder polymer-wax material (e.g., charged 3-D toner)) to a location of the ITB 110 where the build material is located on the ITB 110.

The support material dissolves in different solvents relative to solvents that dissolve the support material to allow the printed 3-D structure formed of the build material to be separated from the support material used in the printing process. In the drawings, the combination of the build material and the support material is shown as element 102, and is sometimes referred to as a developed layer. The developed layer 102 of the build material and the support material is on a discrete area of the ITB 110 and is in a pattern corresponding to the components of the 3-D structure in that layer (and its associated support elements), where the 3-D structure is being built, developed layer 102 by developed layer 102.

Figure 3:
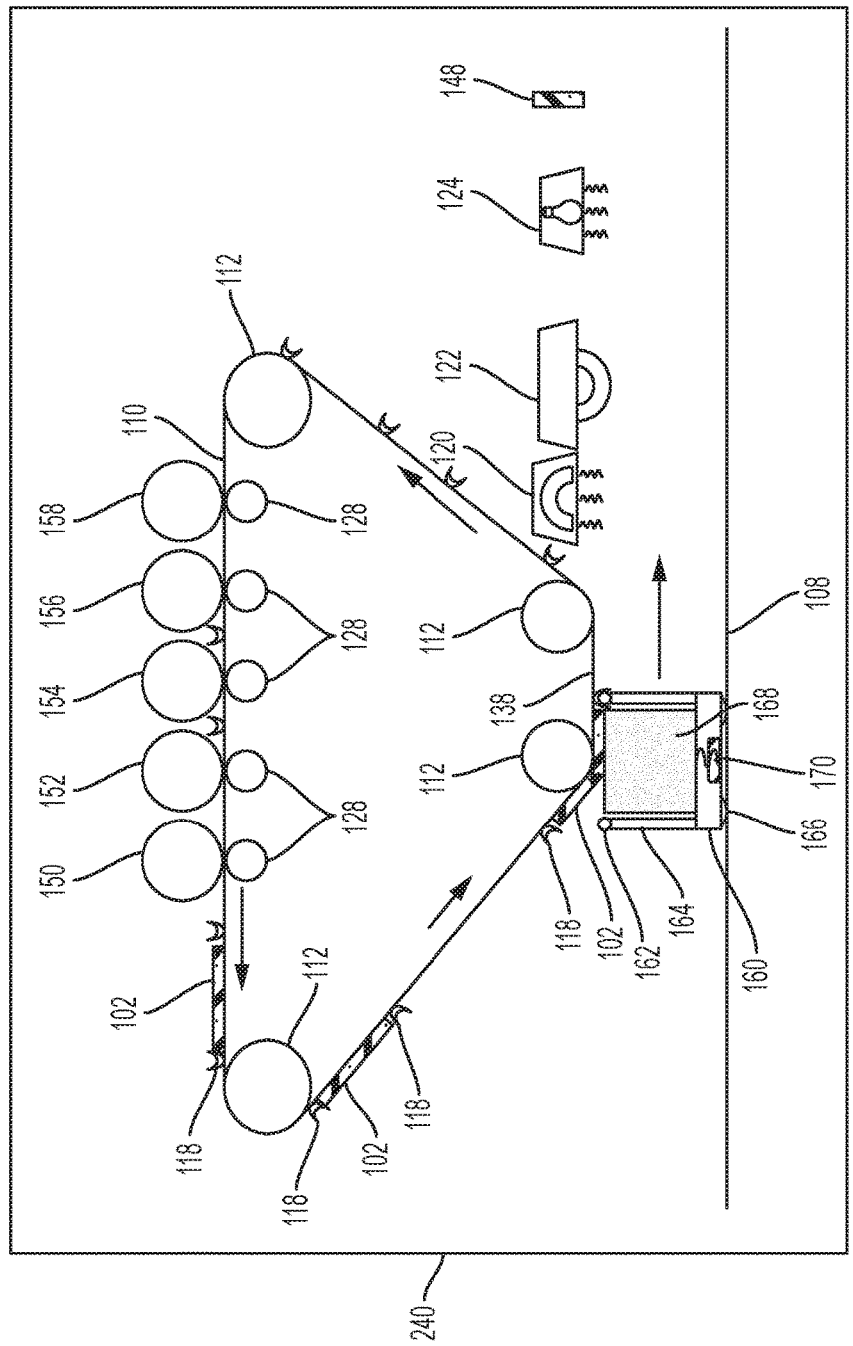

As shown by the arrow in FIG. 3, the wheeled platen 160 moves on the guides 108 toward the ITB 110 to have the wheeled platen 160 make contact with the ITB 110. The ITB 110 electrostatically transfers one of the developed layers 102 of the build material and the support material to the wheeled platen 160 each time the wheeled platen 160 contacts the ITB 110, to successively form developed layers 102 of the build material and the support material on the wheeled platen 160.

FIG. 3 illustrates that the first alignment projections 162 temporarily join with the second alignment projections 118 at the transfer station 138, as the wheeled platens 160 pass the transfer station 138, to align the wheeled platens 160 with the ITB 110 (as the wheeled platens 160 contact the ITB 110).

Such build and support material are printed in a pattern on the ITB by each separate development device 150-158, and combine together in the developed layers 102 to represent a specific pattern having a predetermined length. Thus, each of the developed layers 102 has a leading edge oriented toward the processing direction in which the ITB 110 is moving (represented by arrows next to the ITB 110) and a trailing edge opposite the leading edge.

At the transfuse station 138, the leading edge of the developed layer 102 within the transfuse station 138 begins to be transferred to a corresponding location of the wheeled platen 160. Thus, because the first alignment projections 162 are physically connected to the second alignment projections 118, the wheeled platen 160 moves to contact the developed layer 102 on the ITB 110 as the ITB 110 moves. Thus, in FIG. 3, the trailing edge of the developed layer 102 has not yet reached the transfuse station 138 and has not, therefore, yet been transferred to the wheeled platen 160.

Figure 4:
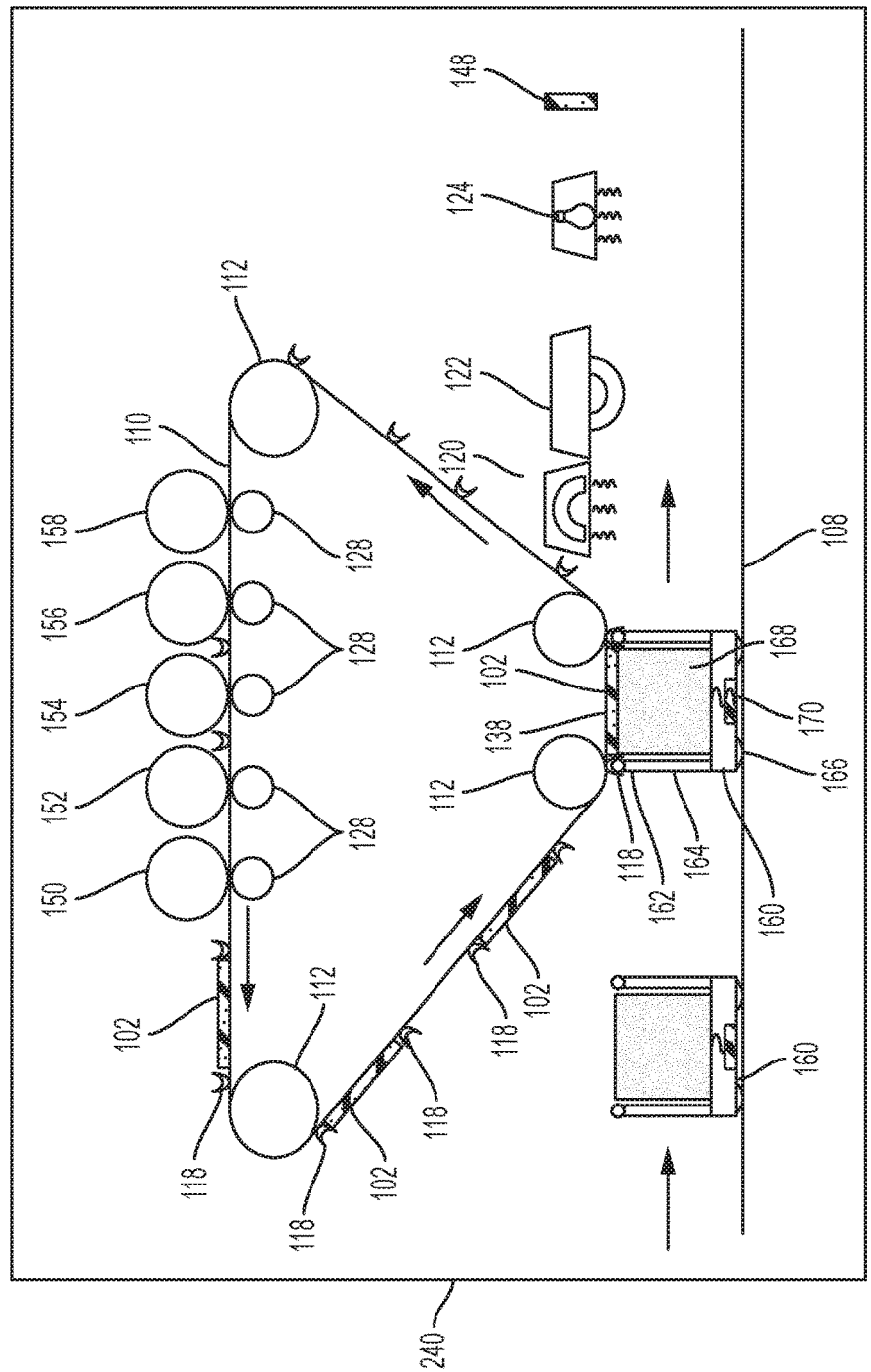

As shown in FIG. 4, because the first alignment projections 162 are physically connected to the second alignment projections 118, the wheeled platen 160 moves exactly synchronously with the ITB 110 (moves at the same speed and the same direction as the ITB 110), to allow the developed layers 102 to transfer cleanly to the wheeled platen 160, without smearing.

FIG. 4 illustrates that both (all) alignment projections 118, 162 can be simultaneously locked (all locked at the same time) while the ITB 110 is transferring a layer 102 at the transfer station 138 to provide exact alignment of the adjustable platform 168 and the portion of the ITB 110 transporting the layer 102. Note also that FIG. 4 shows the next wheeled platen 160 (in the series of wheeled platens 160 shown in FIG. 1) that is to receive the very next layer 102 (already developed on to the ITB 110) approaching the transfer station 138. In the drawings, the details of only a single wheeled platen 160 are identified by number, to avoid clutter.

Figure 5:
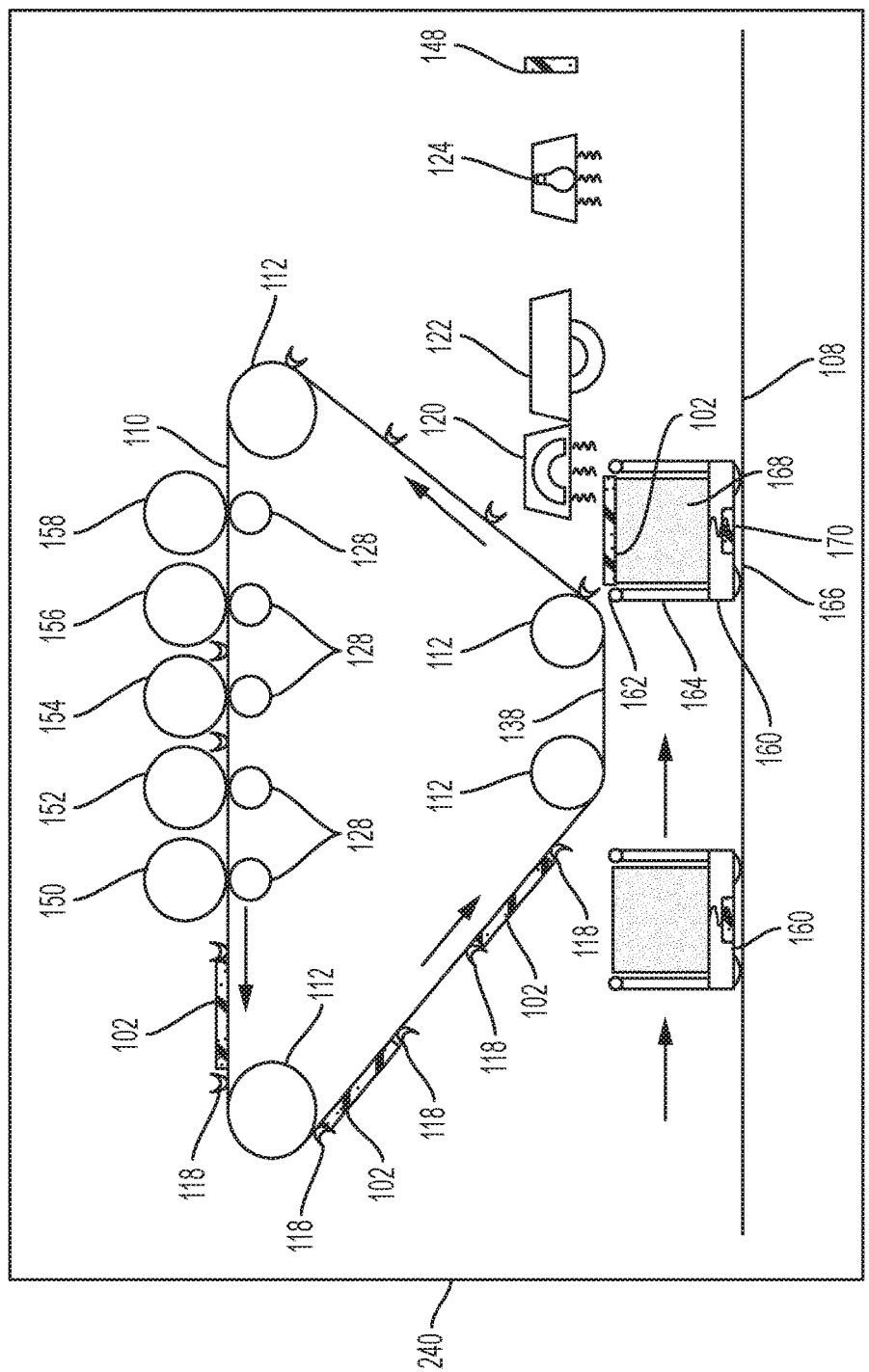

Therefore, with these systems, as the platens 160 enter the transfer station 138, the first alignment projections 162 mesh, engage, or lock with the second alignment projections 118 to provide tight synchronization of the platen 160 with the IBT 110. The alignment projections 162, 118 stay locked during transfer/transfuse, then decouple and continue around the guides 108, as shown in FIG. 5. This relaxes the timing of the wheeled platens 160 in the guides 108, because the locking of the wheeled platens 160 with the ITB ensures correct alignment/timing of the ITB 110 and the top of the adjustable platform 168.

As shown in FIGS. 3 and 4, the first alignment projections 162 are shaped and sized to lock with the second alignment projections 118 as the wheeled platens 160 approach the transfer station 138, and to unlock from the second alignment projections 118 as the wheeled platens 160 depart from the transfer station 138 (as shown in FIG. 5).

Then, as the ITB 110 moves in the processing direction, the wheeled platen 160 moves at the same speed and in the same direction as the ITB 110, until the trailing edge of the developed layer 102 reaches the end of the transfuse station 138 (again because the first alignment projections 162 are physically connected to the second alignment projections 118), at which point the wheeled platen 160 moves along the path of the guides 108 away from the ITB 110 and over to the heater 120, as shown in FIG. 5 (the heater 120 can be a non-contact (e.g., resistive heater, infrared (IR) heater, etc.) which lightly bonds the layer 102 to the platen.

Figure 6:
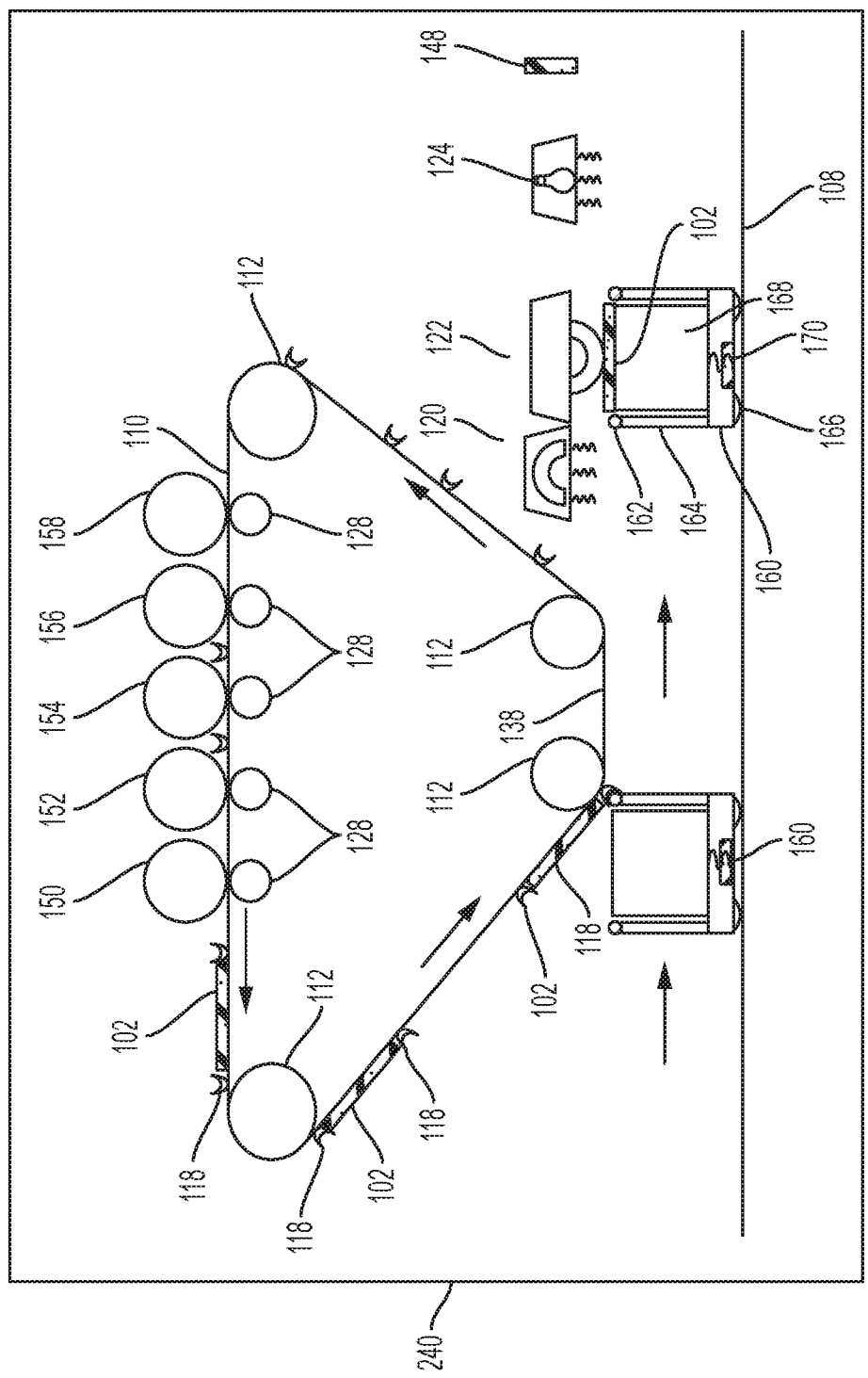

As shown in FIG. 6, the wheeled platen 160 then moves along the path of the guides 108 to the pressure roller 122 (which can also be heated) and moves synchronously as the pressure roller 122 rotates, potentially heating and pressing the developed layer 102 to lightly bond the developed layer 102 to the wheeled platen 160 (or to any previously transferred layers 102 existing on the wheeled platen 160). This synchronous movement between the wheeled platen 160 and the ITB 110 (and pressure roller 122) causes the pattern of support and build materials (102) that is printed by the development devices 150-158 to be transferred precisely from the ITB 110 to the wheeled platen 160, without distortion or smearing. Note also that FIG. 6 illustrates that the very next platen 160 in the sequence begins connecting a first alignment projection 162 with a second alignment projection 118 connected to the ITB 110.

The wheeled platen 160 can be fused by the heater 120 and/or pressure roller 122 after each time the ITB 110 transfers each of the developed layers 102 to the wheeled platen 160 to independently heat and press each of the developed layers 102 and successively join each the developed layer 102 to the wheeled platen 160 and to any previously transferred developed layers 102 on the wheeled platen 160. In other alternatives, the wheeled platen 160 may only receive heat from the heater 120 and/or pressure from the pressure roller 122 after a specific number (e.g., 2, 3, 4, etc.) of the developed layers 102 have been placed on the wheeled platen 160 to allow multiple developed layers 102 to be simultaneously bonded to the wheeled platen 160 and to each other by the heater 120 and/or pressure roller 122.

Figure 7:
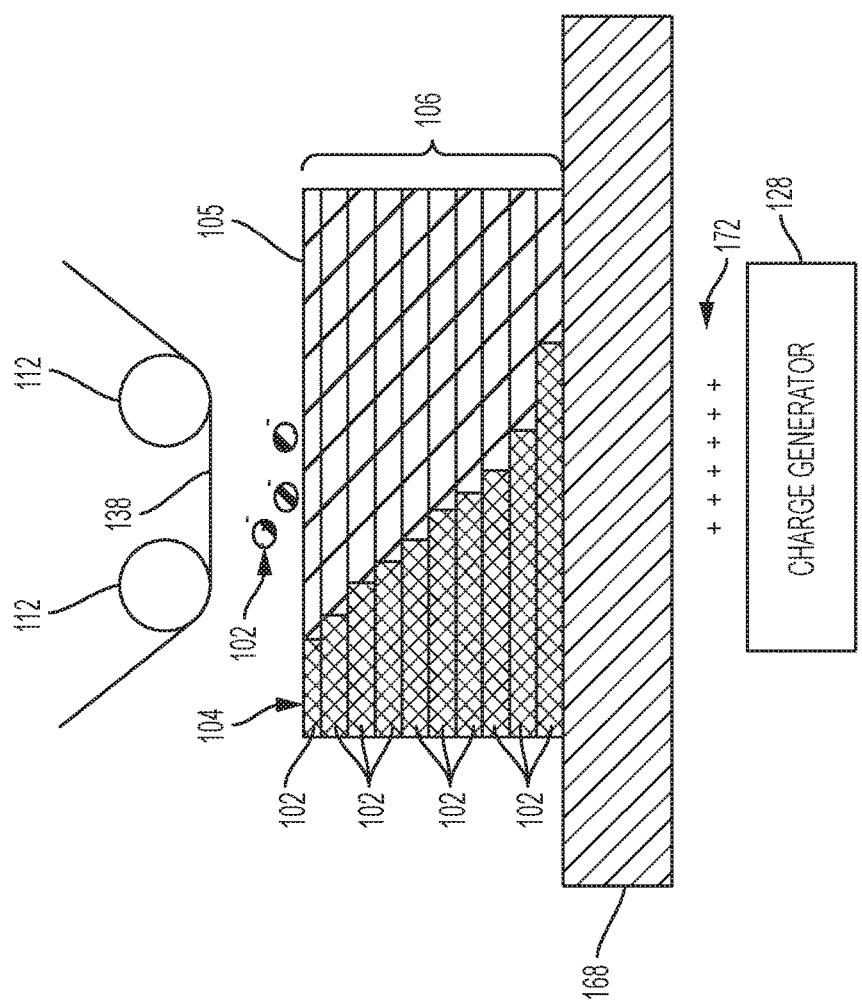
FIG. 7 is an expanded schematic diagram illustrating devices herein.

Thus, the processing in FIGS. 2-6 is repeated to fuse or bond multiple developed layers 102 to the wheeled platen 160 (and to one another), as shown in FIG. 7. FIG. 7 is an expanded diagram, with many elements omitted for clarity, showing how the developed layers 102 may contain some of the build material 104 and some of the support material 105, and how the lowest developed layer 102 is joined to the adjustable platform 168, and how each successive developed layer 102 contacts and is joined to the immediately preceding adjacent developed layer 102 that is below (e.g., is between the layer 102 and the adjustable platform 168) to form a stack 106 of developed layers 102 on the adjustable platform 168.

As noted above, the particles of build materials 104 and support material 105 within each developed layer 102 (shown as particles (not drawn to scale) in FIG. 7, using identification number 102) are charged particles, and FIG. 7 shows these items as negatively charged particles (or they could be positively charged). As is understood by those ordinarily skilled in the art, the printing components 150-158 provide the charge to the particles 102 in order to have such particles electrostatically transfer to the ITB 110. A charge generator 128 can be used to create an opposite charge 172 (in this case a positive charge) on the opposite side of the adjustable platform 168, and this opposite charge 172 draws the charged particles 102 from the ITB 110 to the top of the stack 106.

Here, the "top" layer in the stack is the layer 102 that is furthest away from the adjustable platform 168, and correspondingly, the layer 102 that contacts the adjustable platform 168 is the "bottom" layer in the stack 106. The charge generator 128 can be any type of charge generating device, such as a corona charge device generating charges and projecting (spraying) the charges. The charge 172 generated by the charge generator 128 is opposite the charge of particles of the build materials and the support material 102 on the ITB, and operates in a similar manner to that shown in FIG. 7.

Figure 8:
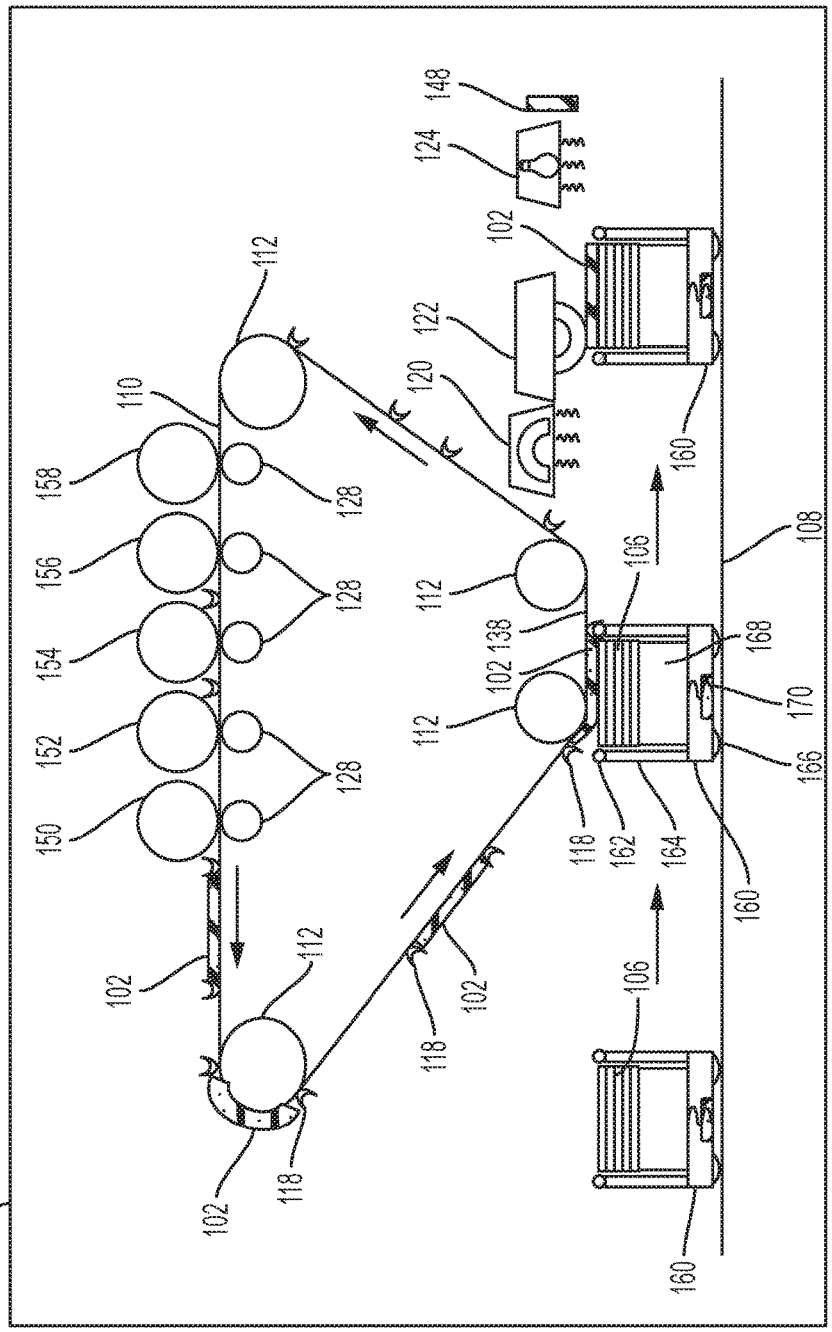
FIGS. 8-19 are schematic cross-sectional diagrams partially illustrating devices herein.
Figure 9:
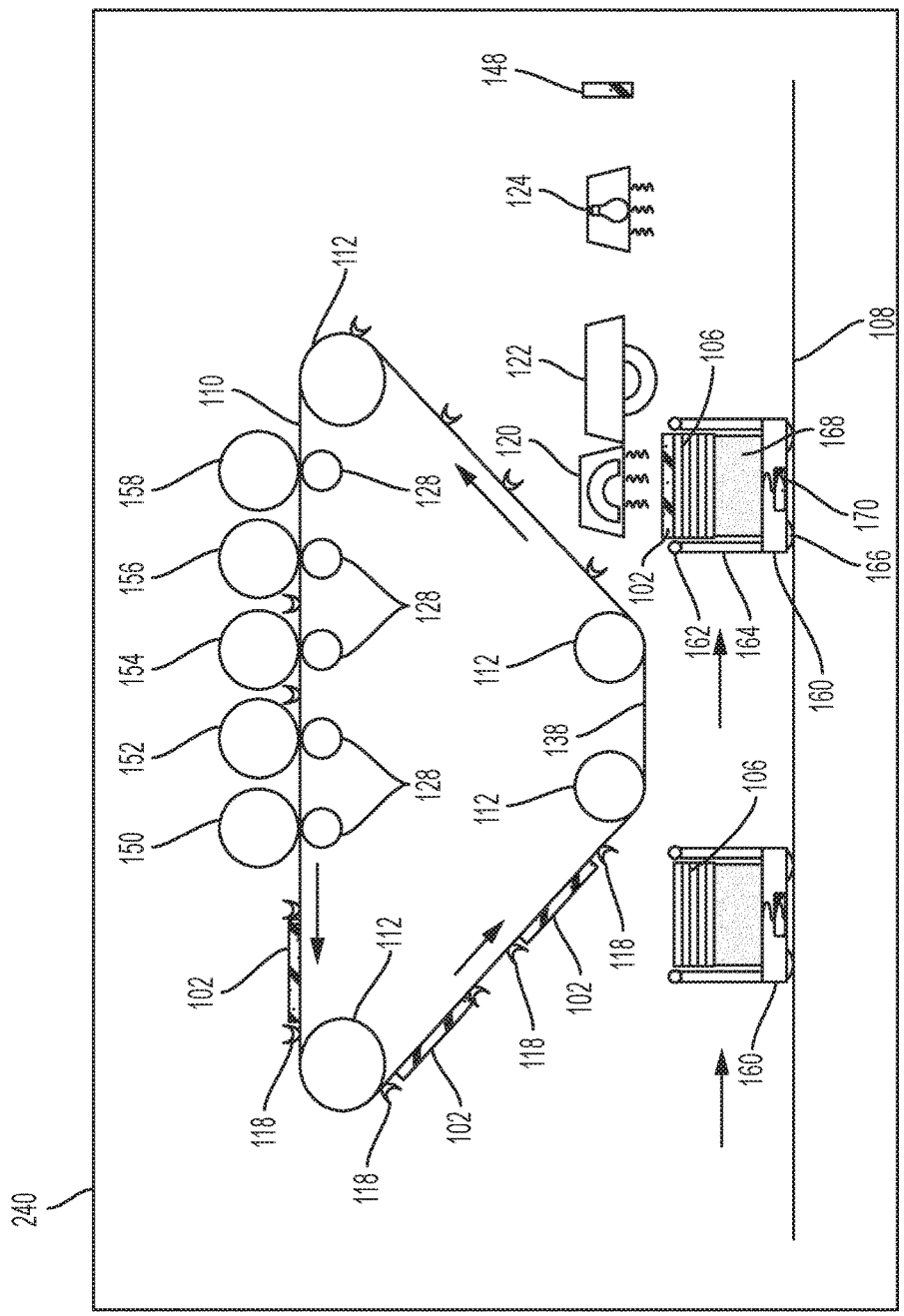

As the stack 106 of the developed layers 102 grows, additional developed layers 102 are formed on top of the stack 106, as shown in FIG. 8, and such additional developed layers 102 are heated by the heater 120, as shown in FIG. 9, and pressed by the pressure roller 122, as shown in FIG. 8, to bond/fuse all the develop layers 102 within the stack 106 together.

As shown in FIG. 8, the wheeled platens 160 progress in a series by the transfer station 138 in order to sequentially have each platen 160 obtain an additional layer 102. The layers 102 being transferred to the different stacks 106 on each of the different platens 160 can be the same or can be different. Therefore, if multiple copies of the same 3-D item are being printed on all platens 160, the same layer will be printed on each of the different platens 160 (from the first platen in the series of platens 160 on the guides 108, to the last platen in the series) after which the next layer of the multiple-copy structure being printed will be transferred to all of the platens 160 in the series.

However, the systems and methods herein can also print a different 3-D item on each of the platens 160 in the series of platens 160 on the guides 108. In this situation, the development devices 150-158 print different patterned layers 102 on the ITB 110 in a synchronous order in which the different platens 160 will arrive at the transfer station 138. Thus, the layers 102 are printed in a planned sequence so that each successive platen 160 receives a unique layer 102 that is specific to the 3-D structure being printed on that platen 160, and is different from the layer 102 being transferred to the next platen 160 in the series. In other words, each layer 102 printed by development devices 150-158 can have a different pattern corresponding to a different 3-D item, and the timing of when each different layer 102 is transferred to the ITB 110 is controlled so that each platen 160 will arrive at the transfer station 138 to receive a specific layer 102 that corresponds to the 3-D item being formed in the stack on that specific platen 160. In this way, the devices and methods here and can provide 3-D printing of multiple copies of a single 3-D item on different platens 160, or can provide simultaneous printing of different 3-D items on different platens 160, in batch processing that simultaneously prints multiple 3-D items (one per platen 160) in each batch.

Figure 10:
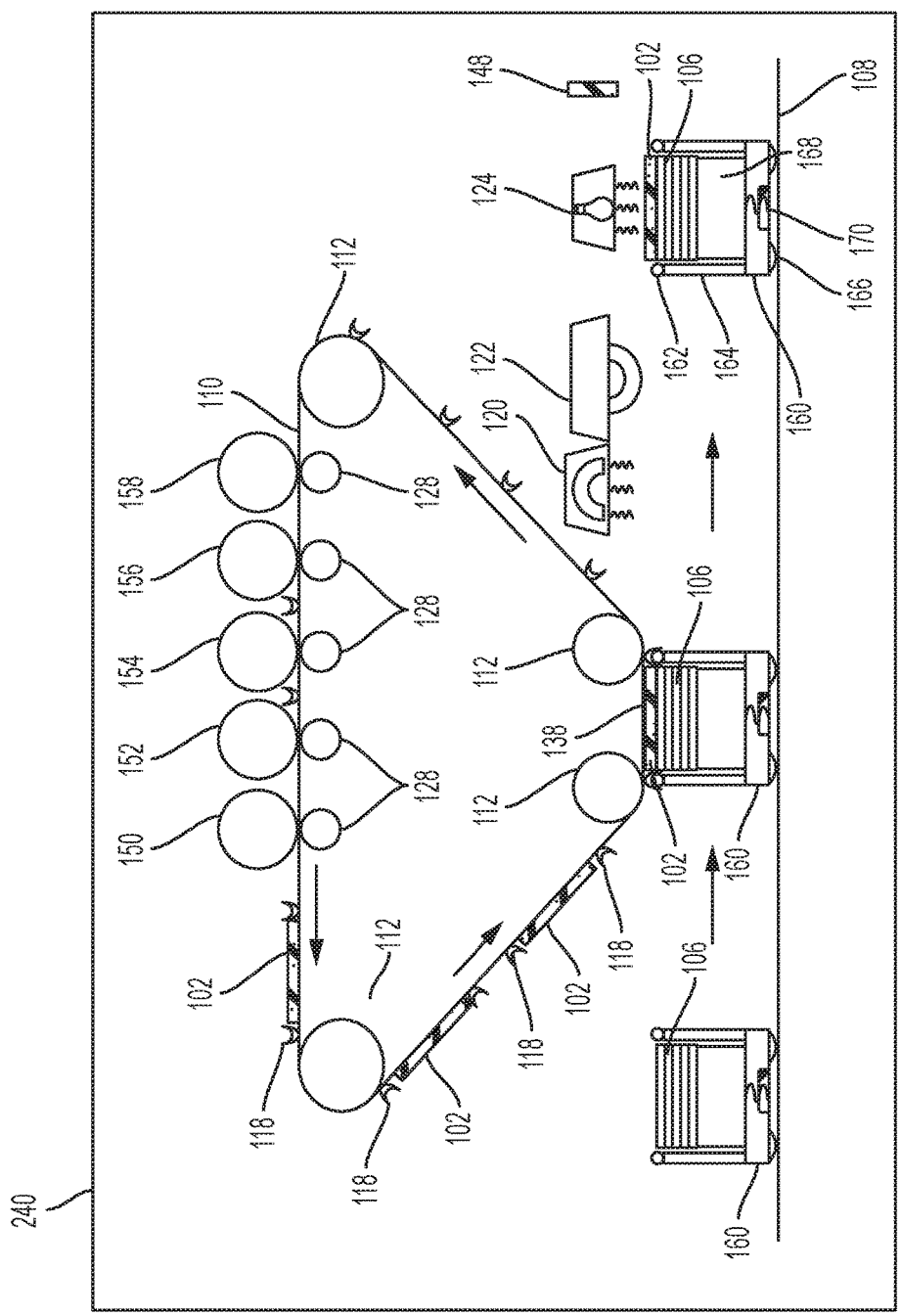

As shown in FIG. 10, the wheeled platen 160 moves on the guides 108 to the curing station 124 that is configured to apply light and/or heat to the 3-D structure to cure the developed layers 102 into the freestanding stack 106 on the wheeled platen 160. The selective use of heaters, lights, and other components of the curing station 124 will vary depending upon the chemical makeup of the developed layers 102.

In one example, the build material 104 and the support material 105 can be UV curable toners. Curing station 124 cures such materials by heating the materials to a temperature between their glass transition temperature and their melting temperature, and applying UV light to cross-link polymers within at least the build materials (and possibly within the support materials also) thereby creating a rigid structure. Those ordinarily skilled in the art would understand that other build and support materials could utilize other bonding processing and bonding components, and that the foregoing is presented only as one limited example; and the devices and methods herein are applicable to all such bonding methods and components, whether currently known or developed in the future.

Figure 11:
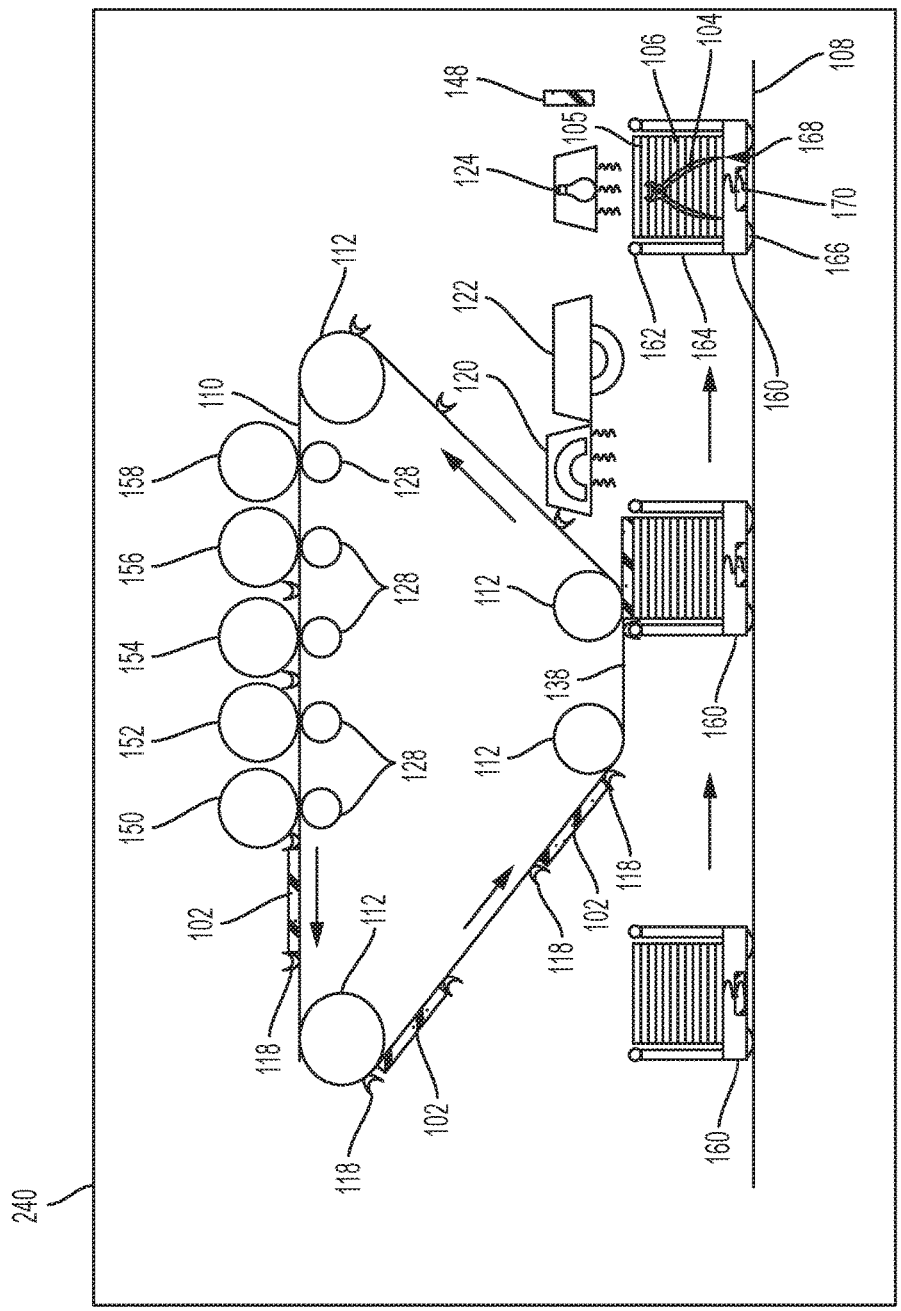

Therefore, the curing station 124 can apply light and/or heat after each time the ITB 110 transfers a layer 102 to the wheeled platen 160, to independently cure each layer 102 or the layers 102 can be cured in groups, or the curing station 124 may not be utilized until the entire freestanding stack 106 is completely formed, as shown in FIG. 11. In FIG. 11 an overlay is illustrated showing portions of support material 105 and build material 104 within the freestanding stack 106. Such may or may not be visible, and is only illustrated to show one exemplary way in which such build and support materials may be arranged.

Figure 12:
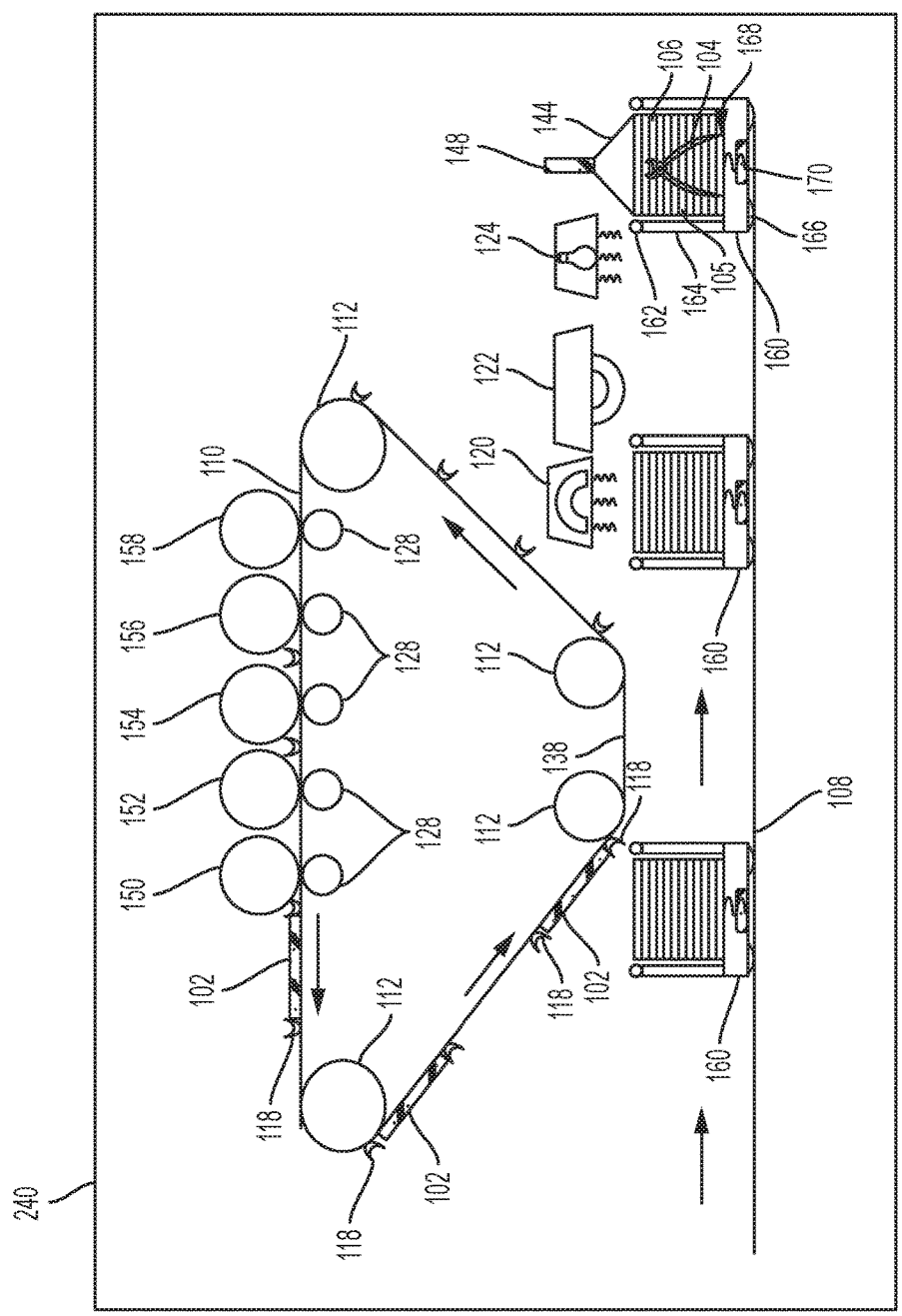
Figure 13:
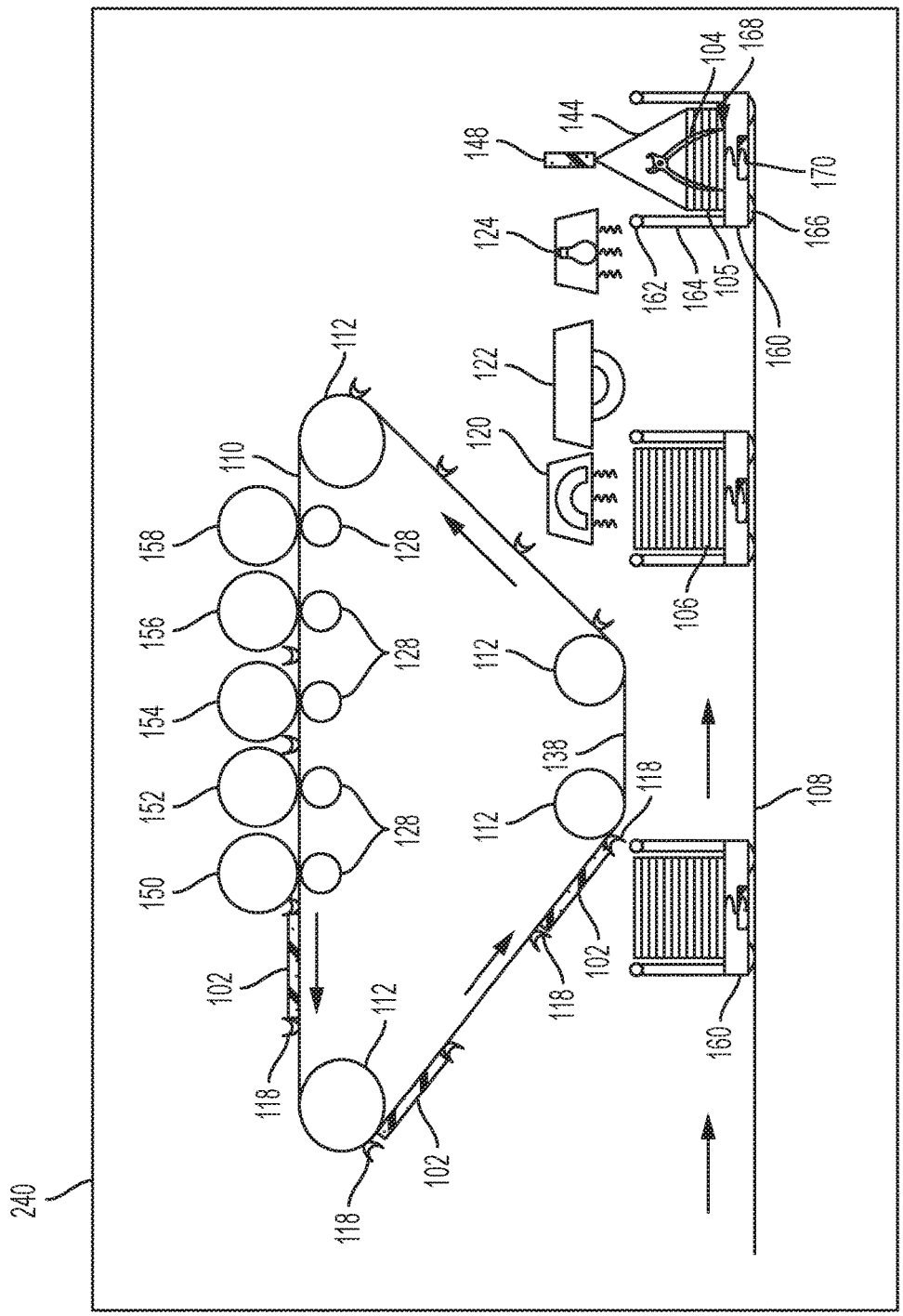
Figure 14:
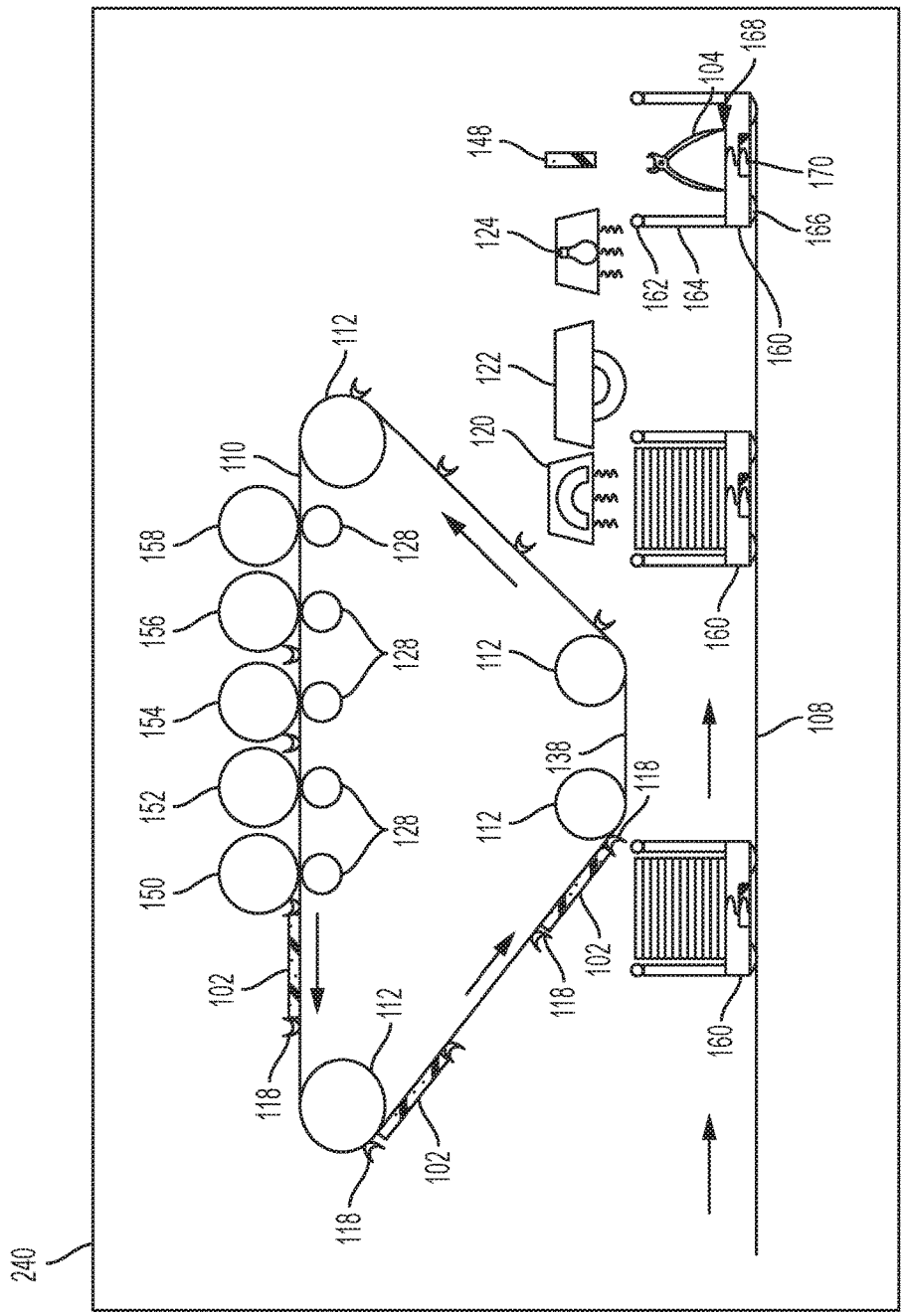
Figure 15:
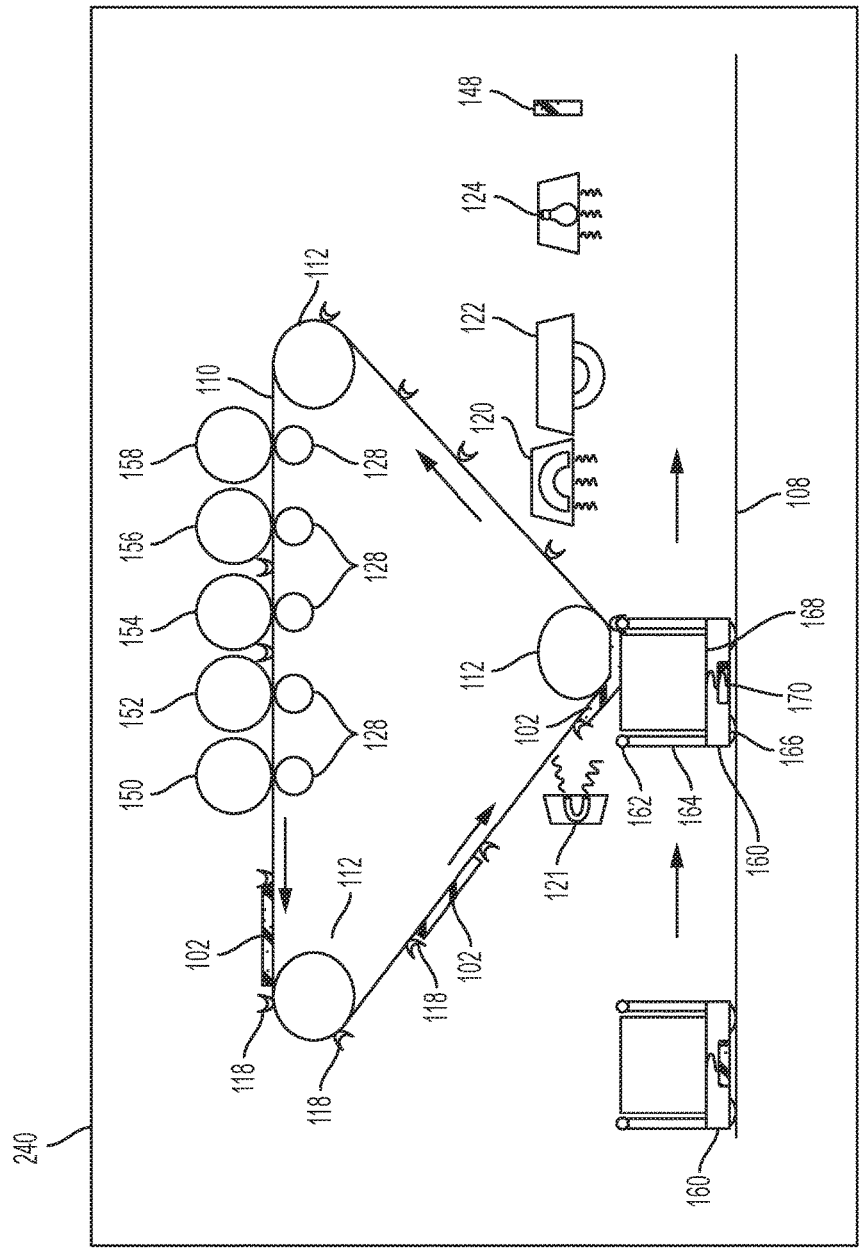
Figure 16:
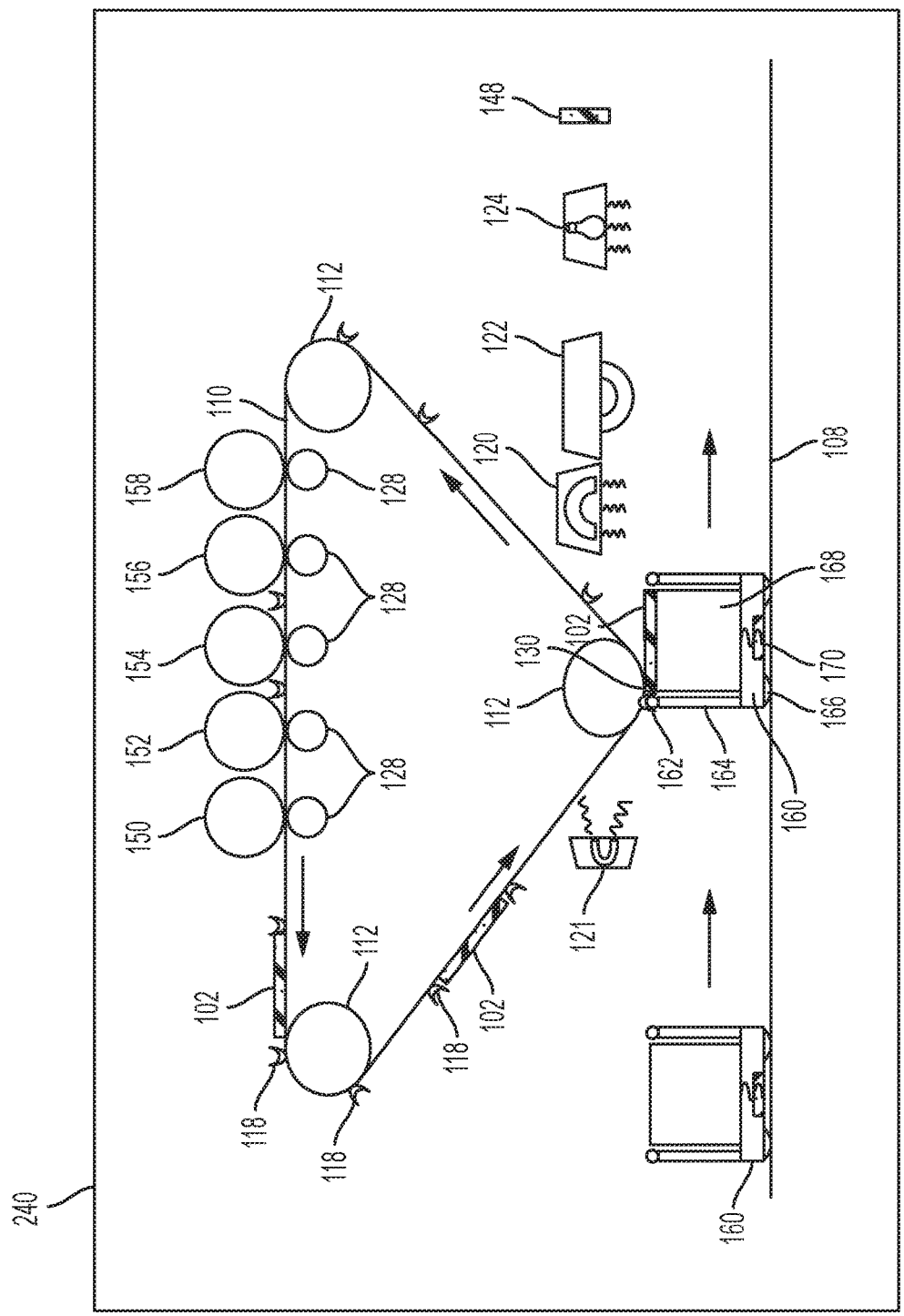

The 3-D structure in the freestanding stacks 106 on the platens 160 can be output to allow manual removal of the support material 105 using an external solvent bath; or processing can proceed as shown in FIG. 12-14. More specifically, in FIG. 12, the support material removal station 148 is positioned along the path of the guides 108 to receive the now bonded 3-D structure (freestanding stack 106) on the wheeled platen 160. The support material removal station 148 applies a solvent 144 that dissolves the support material 105 without affecting the build material 104. Again, as noted above, the solvent utilized will depend upon the chemical makeup of the build material 104 and the support material 105. FIG. 13 illustrates the processing where about half of the support material 105 remains, and a portion of the build material 104 protrudes from the remaining stack of support material 105. FIG. 14 illustrates processing after the support material removal station 148 has applied sufficient solvent 146 to dissolve all the support material 105, leaving only the build material 104 remaining, which leave a completed 3-D structure made of only the build material 104.

FIGS. 15-18 illustrate an alternative 3-D electrostatic printing structure herein which includes a transfuse nip 130 in place of the planar transfuse station 138 shown in FIGS. 1-14. As shown in FIG. 1, the planar transfuse station 138 is a planar portion of the ITB 110 that is between rollers 112 and is parallel to the wheeled platen 160; while in FIG. 15, the transfuse nip 130 presents a single point of transfer.

Additionally, at some point, the height of the stack 106 may make the distance between the charged (build and support) particles 102 greater than the ability of the opposite charges 152 to attract the charged particles 102 (and this height will vary, depending upon the strength of the various charges), as shown in FIG. 7. In view of this, the structure shown in FIG. 2, and/or the structure shown in FIG. 16 can include a transfuse nip heater 121. If the transfuse nip heater 121 is included in the structure, the developed layer 102 and ITB 110 are locally heated by the transfuse nip heater 121 to bring the developed layer 102 to a "tacky" state prior to transfuse (i.e., to a temperature higher than the glass transition temperature (Tg) but short of the melt or fuse temperature Tm of the toner resin). The adjustable platform 168 is also heated by transfuse nip heater 121 to approximately the same temperature, and is then contacted synchronously with the tacky layer 102 as it translates through the ITB-platen nip (the transfuse nip 130). Thereby, the ITB 110 transfers one of the developed layer 102 of the build material 104 and the support material 105 to the platen 160 each time the platen 160 contacts the ITB 110, to successively form developed layers 102 of the build material 104 and the support material 105 on the platen 160.

Figure 17:
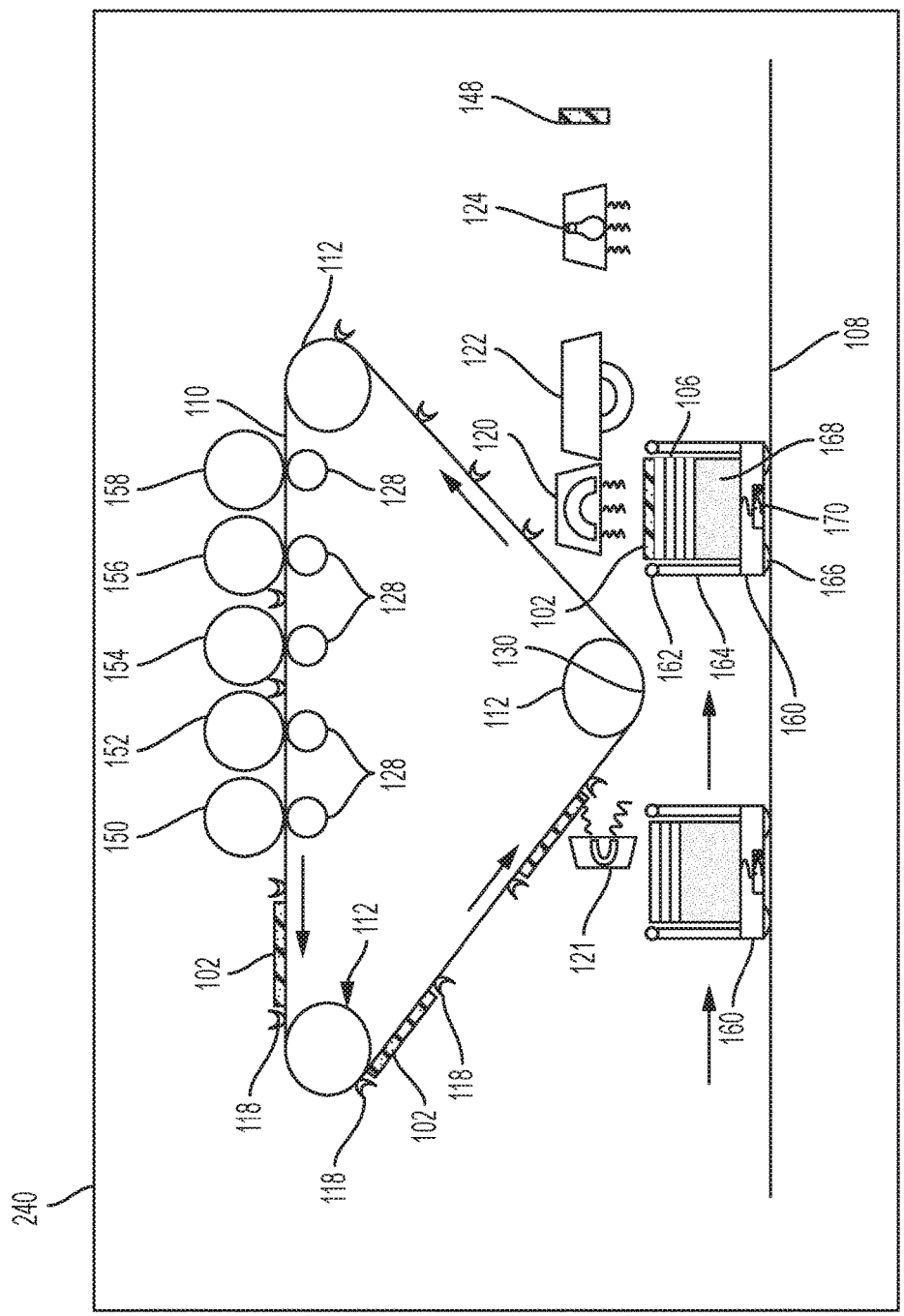
Figure 18:
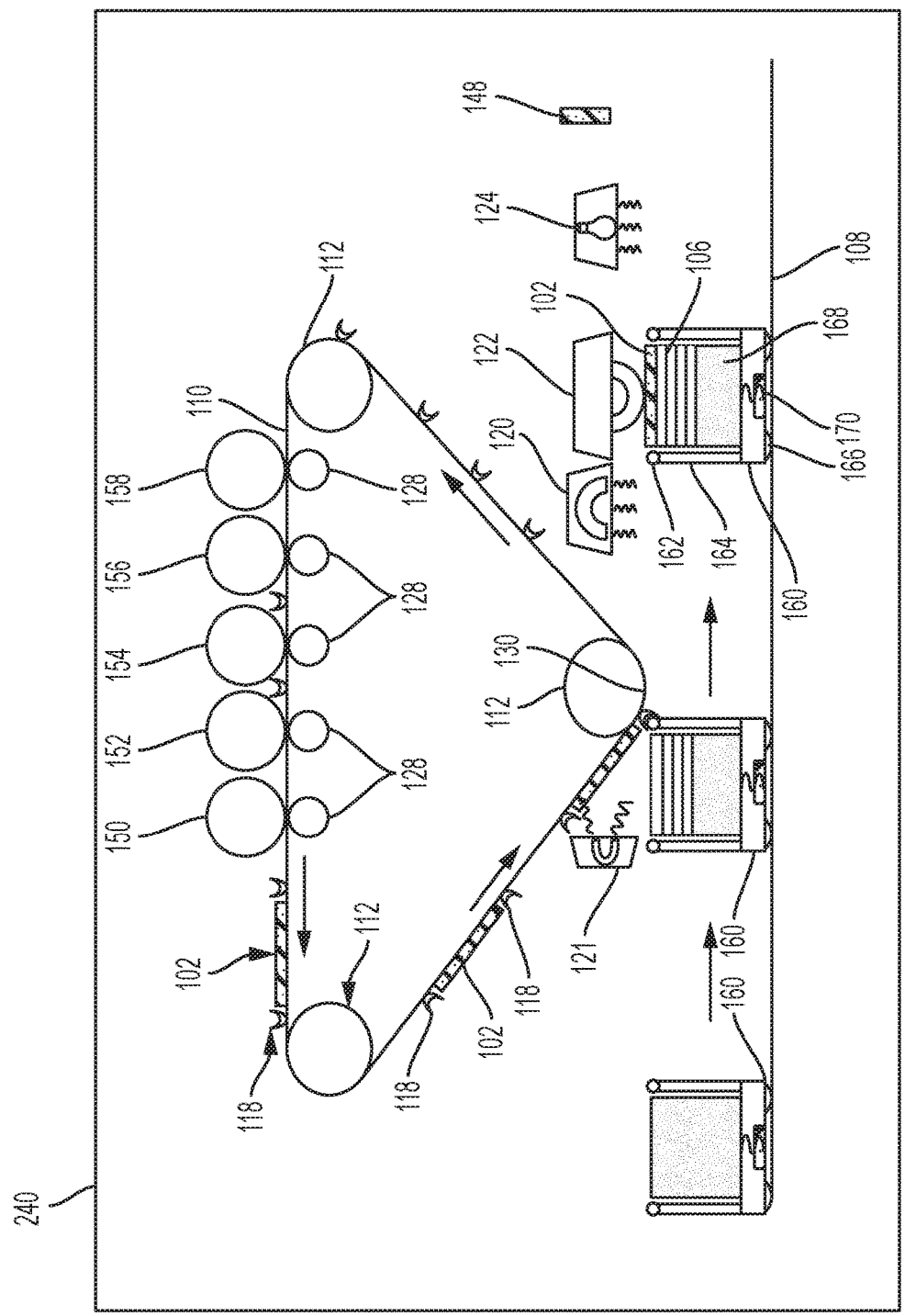

In similar operations to that discussed above, as shown in FIGS. 15 and 16, the wheeled platen 160 moves synchronously with the ITB 110, by having the alignment projections 118, 162 lock and unlock, to have each layer 102 transfer onto the wheeled platen 160 cleanly and without smearing, and such processing is repeated to eventually form a stack 106 of the layers 102. After transferring each successive layer 102 to the wheeled platen 160, each layer 102 (or groups of layers 102 in a stack 106) are heated by the heater 120, and pressed by the pressure roller 122, as shown in FIGS. 17 and 18. Eventually, as discussed above, the stack 106 of layers 102 is cured using the curing station 124. Additionally, all other processing mentioned above can be performed using the structure shown in FIGS. 16-22.

Figure 19:
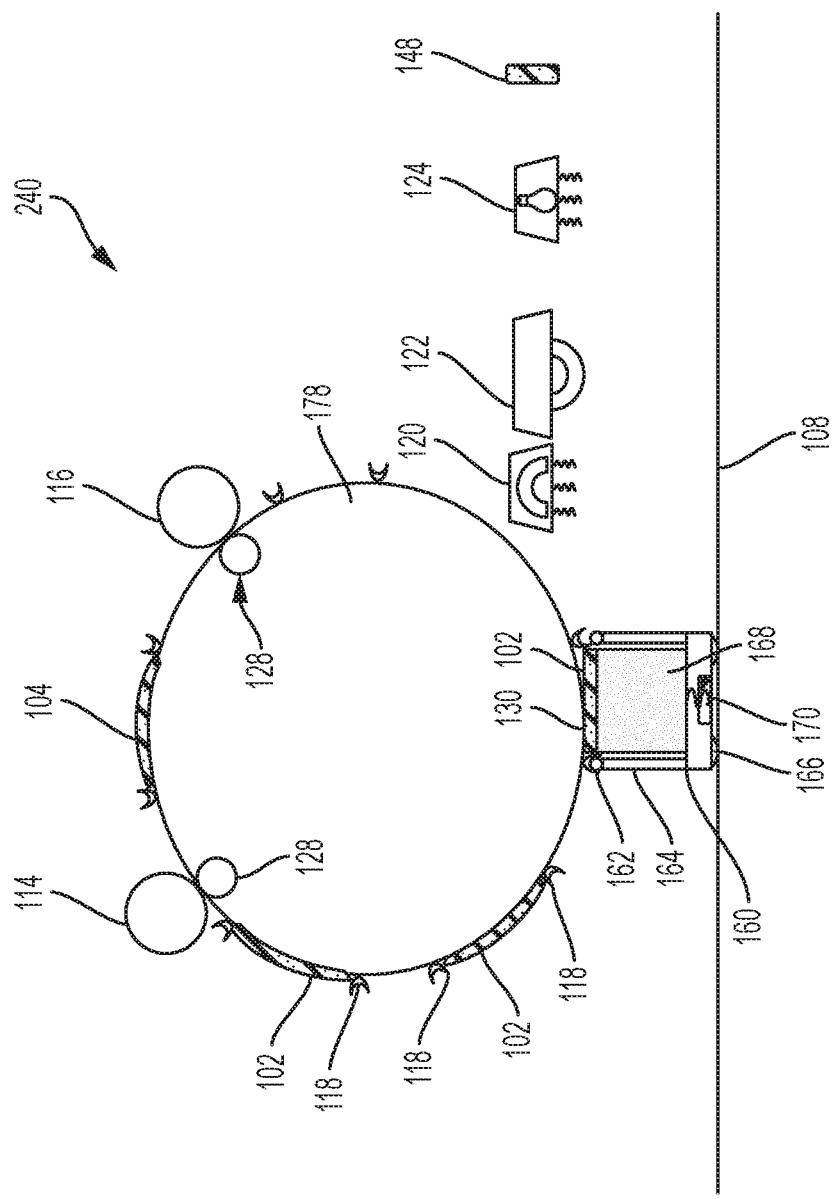
Figure 20E:
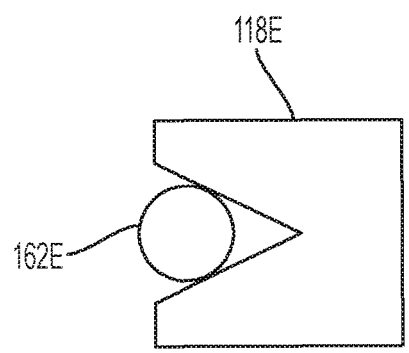
Figure 20F:
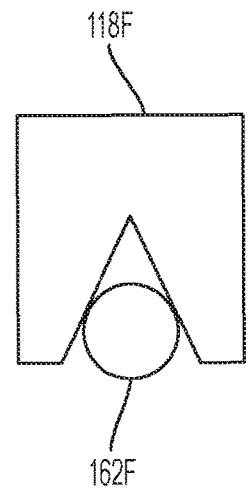
Figure 20G:
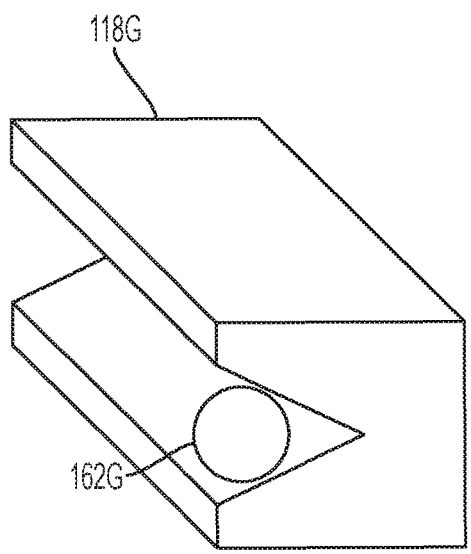
Figure 20H:
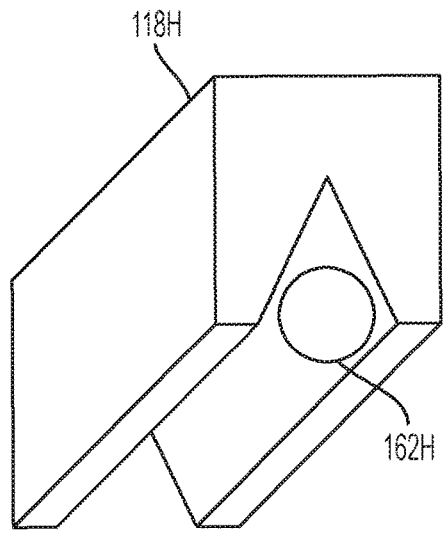

As shown in FIG. 19 a drum 178 (or any other photoreceptor surface) could be used in place of the ITB 110, with all other components operating as described herein. Thus, the drum 178 includes the second alignment projections 118, and could be an intermediate transfer surface receiving material from development stations 114, 116, as described above, or could be a photoreceptor and operate as the photoreceptor 256 described below operates, by maintaining a latent image of charge and receiving materials from development devices 254.

While a limited number of structures have been discussed above, FIGS. 20A-20F illustrate some examples of the first alignment projections 162A-162F and the second alignment projections 118A-118F, although those ordinarily skilled in the art would understand that other shapes could be used for the alignment projections. Thus, as some examples, the first alignment projections 162 and the second alignment projections 118 are matching pairs of balls and sockets 118A, 162A, cones and cone receptacles 118B, 162B, cylinders and tubes 118C, 162C, balls and cones 118D, 162D, ball and V-groves 118E, 118F, 162E, 162F etc. FIGS. 20G-22H illustrate that the second alignment projections 118G, 118H can be short or long linear structures (e.g. "slots") within which balls 162G, 162H lock, examples of which are also shown in cross section in FIGS. 20E-20F.

Figure 21A:
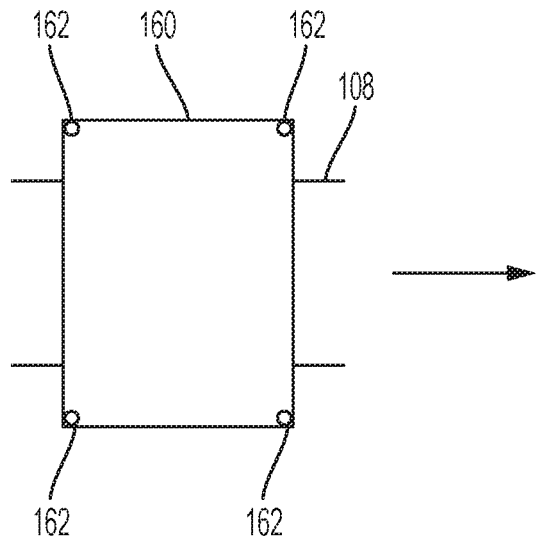
FIGS. 21A-22C are schematic top-view diagrams illustrating alignment devices herein.
Figure 21B:
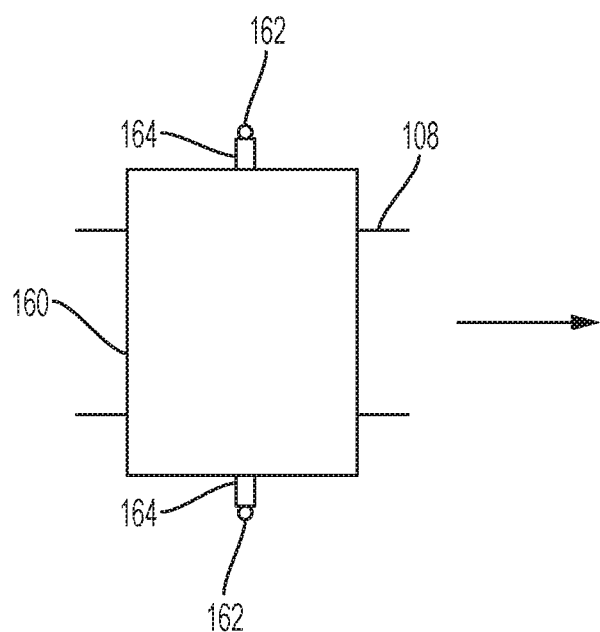
Figure 21C:
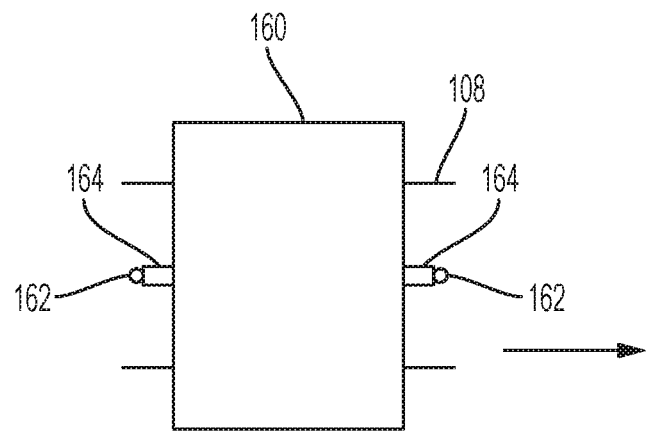
Figure 21D:
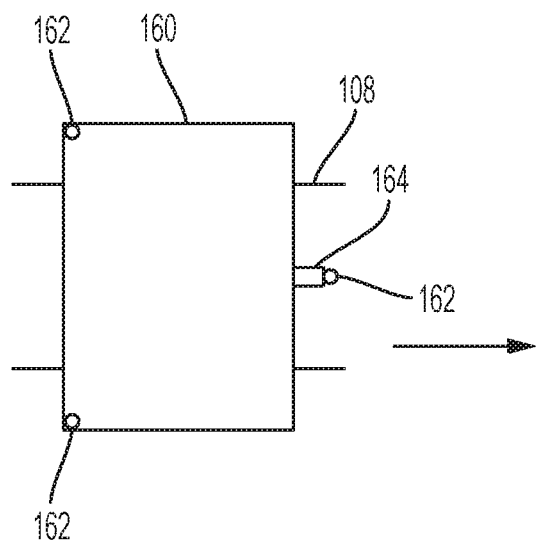

Also, FIGS. 21A-21D illustrate that the first alignment projections 162 can be located at any appropriate location that does not come between the ITB 110 and the top of the adjustable platform 168 (although those ordinarily skilled in the art would understand that other locations could be used). Therefore, as shown in FIG. 21A, the first alignment projections 162 can be on the corners of the wheeled platen 160; as shown in FIG. 21B, the first alignment projections 162 can extend from the sides (inboard and outboard sides) of the wheeled platen 160; as shown in FIG. 21C, the first alignment projections 162 can extend from the front and back of the wheeled platen 160; as shown in FIG. 21D, two of the first alignment projections 162 can be on two of the corners of the wheeled platen 160 and one of the first alignment projections 162 can extend from the front or back of the wheeled platen 160. Here, the "sides" are parallel to the process direction (arrows) and the guides, and the front and back are perpendicular to the inboard and outboard sides.

Figure 22A:
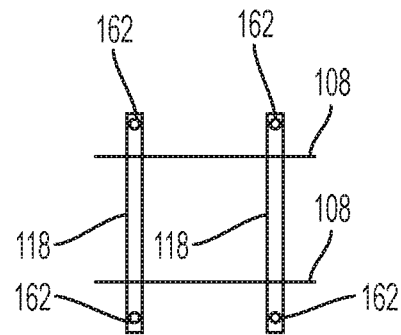
Figure 22B:
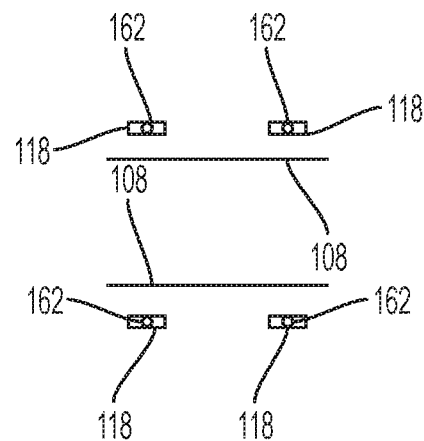
Figure 22C:
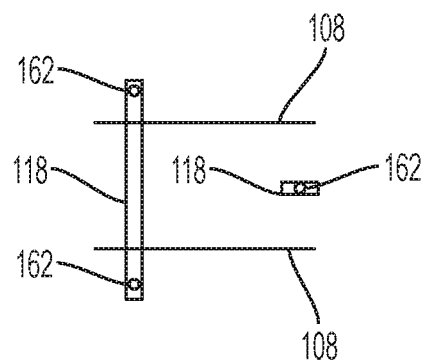

For spatial reference, FIGS. 22A-22C also illustrate the locations of the guides 108 and the first alignment projections 162. As shown in the example in FIG. 22A, the second alignment projections 118 are elongated structures that are perpendicular to the guides 108 and can extend the full width of the ITB 110; and therefore, multiple first alignment projections 162 lock within a single second alignment projection 118 in the example shown in FIG. 22A. Alternatively, as shown in FIG. 22B, the second alignment projections 118 can be shorter linear structures that are parallel to the guides 108; and, in this situation, each of the second alignment projections 118 only locks with a single first alignment projection 162. FIG. 22C illustrates that different combinations of the foregoing second alignment projections 118 linear structures can be utilized.

While some exemplary shapes and locations of the first and second alignment projections 162, 118 are illustrated in the drawings, those ordinarily skilled in the art would understand that the claims presented below are intended to encompass all similarly shaped and similarly located features; and that the drawings only show a limited number of examples, in order to allow the reader to understand the general concepts being disclosed. Therefore, the claims presented below are not limited to the shapes and locations presented in the drawings, but instead are intended to include all similar structures.

Figure 23:
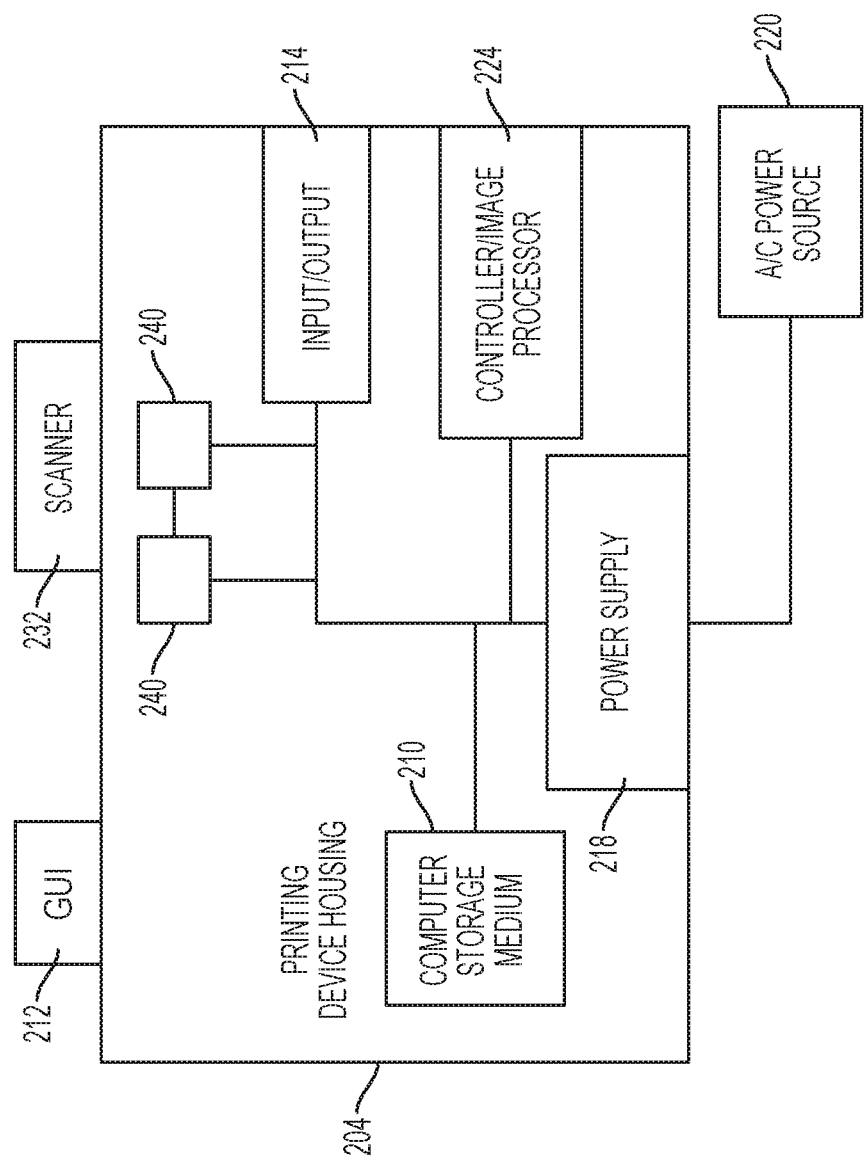
FIG. 23 is a schematic cross-sectional diagram of a printing device herein.

FIG. 23 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 23, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

The one or more printing engines 240 are intended to illustrate any marking device that applies build and support materials (toner, etc.) whether currently known or developed in the future and can include, for example, devices that use an intermediate transfer belt 110 (as shown above). While the drawings illustrates five development stations adjacent or in contact with a rotating belt (110), as would be understood by those ordinarily skilled in the art, such devices could use any number of marking stations (e.g., 2, 3, 5, 8, 11, etc.).

Figure 24:
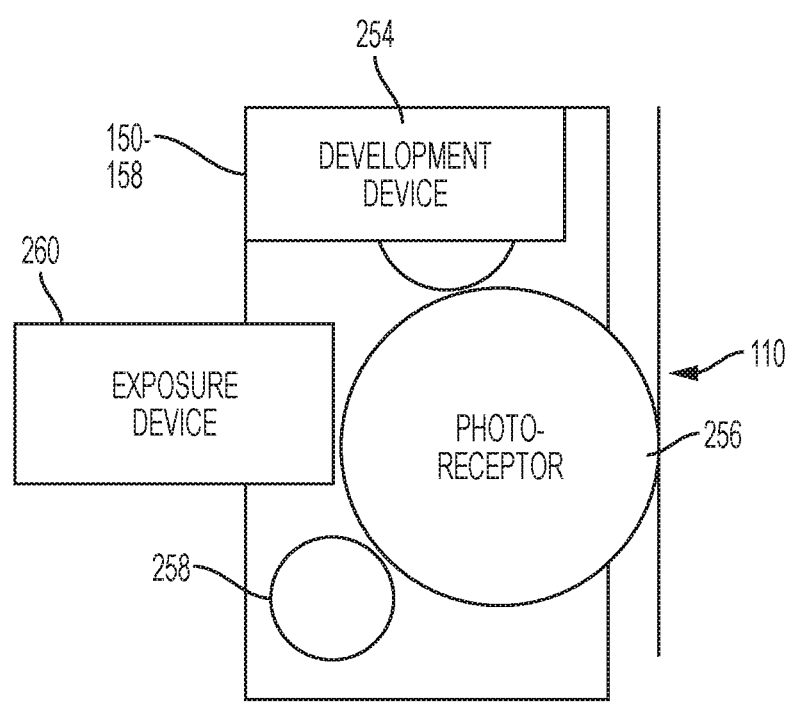
FIG. 24 is an expanded schematic diagram illustrating development devices herein.

One exemplary individual electrostatic development station 150-158 is shown in FIG. 24 positioned adjacent to (or potentially in contact with) intermediate transfer belt 110. Each of the individual electrostatic development stations 150-158 includes its own charging station 258 that creates a uniform charge on an internal photoreceptor 256, an internal exposure device 260 that patterns the uniform charge into a patterned charge on the photoreceptor, and an internal development device 254 that transfers build or support material to the photoreceptor 256.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printing system comprising:
an intermediate transfer surface;
development stations positioned to electrostatically transfer build and support materials to said intermediate transfer surface;
a transfer station adjacent said intermediate transfer surface;
guides adjacent said transfer station; and
platens moving on said guides,
said guides are shaped to direct said platens to pass said transfer station and come in contact with said intermediate transfer surface at said transfer station,
said intermediate transfer surface transfers a layer of said build and support materials to said platens each time said platens contact said intermediate transfer surface at said transfer station to successively form layers of said build and support materials on said platens,
said platens include first alignment features,
said intermediate transfer surface includes second alignment features, and
said first alignment features temporarily join with said second alignment features at said transfer station, as said platens pass said transfer station, to align said platens with said intermediate transfer surface as said platens contact said intermediate transfer surface.

2. The 3-D printing system according to claim 1, said first alignment features are shaped and sized to lock with said second alignment features as said platens approach said transfer station, and to unlock from said second alignment features as said platens depart from said transfer station.

3. The 3-D printing system according to claim 1, said first alignment features and said second alignment features are matching pairs of balls and sockets, cones and cone receptacles, or cylinders and tubes.

4. The 3-D printing system according to claim 1, said guides comprise at least one of rails, tracks, slots, magnetic pathways, or tubes.

5. The 3-D printing system according to claim 1, said guides are positioned in a loop and return said platens to said transfer station after said platens pass through said transfer station to have more of said layers of said build and support materials transferred to said platens.

6. The 3-D printing system according to claim 1, further comprising a drive device moving said platens along said guides.

7. The 3-D printing system according to claim 6, said drive device comprising at least one of an electric motor, a chain drive, and magnetic drive units.

8. A three-dimensional (3-D) printing system comprising:
an intermediate transfer belt (ITB);
development stations positioned to electrostatically transfer build and support materials to said ITB;
a transfer station adjacent said ITB;
guides adjacent said transfer station; and
platens moving on said guides,
said guides are shaped to direct said platens to repeatedly pass said transfer station and come in contact with said ITB at said transfer station,
said ITB transfers a layer of said build and support materials to said platens each time said platens contact said ITB at said transfer station to successively form layers of said build and support materials on said platens,
said platens include first alignment projections,
said ITB includes second alignment projections,
said first alignment projections temporarily join with said second alignment projections at said transfer station, as said platens pass said transfer station, to align said platens with said ITB as said platens contact said ITB, and
said platens include a height adjustment that moves a surface said platen away from said ITB as a stack of said layers on said platens becomes larger.

9. The 3-D printing system according to claim 8, said first alignment projections are shaped and sized to lock with said second alignment projections as said platens approach said transfer station, and to unlock from said second alignment projections as said platens depart from said transfer station.

10. The 3-D printing system according to claim 8, said first alignment projections and said second alignment projections are matching pairs of balls and sockets, cones and cone receptacles, or cylinders and tubes.

11. The 3-D printing system according to claim 8, said guides comprise at least one of rails, tracks, slots, magnetic pathways, or tubes.

12. The 3-D printing system according to claim 8, said guides are positioned in a loop and return said platens to said transfer station after said platens pass through said transfer station to have more of said layers of said build and support materials transferred to said platens.

13. The 3-D printing system according to claim 8, further comprising a drive device moving said platens along said guides.

14. The 3-D printing system according to claim 13, said drive device comprising at least one of an electric motor, a chain drive, and magnetic drive units.

15. A three-dimensional (3-D) printing system comprising:
an intermediate transfer belt (ITB);
development stations positioned to electrostatically transfer build and support materials to said ITB;
a transfer station adjacent said ITB;
guides adjacent said transfer station, said guides define a path; and
wheeled platens moving on said guides,
said guides restrict movement of said wheeled platens to only said path,
said guides are shaped to direct said wheeled platens to repeatedly pass said transfer station and come in contact with said ITB at said transfer station,
said ITB transfers a layer of said build and support materials to said wheeled platens each time said wheeled platens contact said ITB at said transfer station to successively form layers of said build and support materials on said wheeled platens,
said wheeled platens include first alignment projections,
said ITB includes second alignment projections,
said first alignment projections temporarily join with said second alignment projections at said transfer station, as said wheeled platens pass said transfer station, to align said wheeled platens with said ITB as said wheeled platens contact said ITB, and
said wheeled platens include a height adjustment that moves the top surface said platen away from said ITB as a stack of said layers on said wheeled platens becomes larger.

16. The 3-D printing system according to claim 15, said first alignment projections are shaped and sized to lock with said second alignment projections as said wheeled platens approach said transfer station, and to unlock from said second alignment projections as said wheeled platens depart from said transfer station.

17. The 3-D printing system according to claim 15, said first alignment projections and said second alignment projections are matching pairs of balls and sockets, cones and cone receptacles, or cylinders and tubes.

18. The 3-D printing system according to claim 15, said guides comprise at least one of rails, tracks, slots, magnetic pathways, or tubes.

19. The 3-D printing system according to claim 15, said guides are positioned in a loop and return said wheeled platens to said transfer station after said wheeled platens pass through said transfer station to have more of said layers of said build and support materials transferred to said wheeled platens.

20. The 3-D printing system according to claim 15, further comprising a drive device moving said wheeled platens along said guides.

* * * * *